United States Patent
Holt

(10) Patent No.: US 10,627,647 B1
(45) Date of Patent: Apr. 21, 2020

(54) RETRACTABLE EYEWEAR RETENTION DEVICE

(71) Applicant: BBT Innovations LLC, Glen, MT (US)

(72) Inventor: Robert Holt, Glen, MT (US)

(73) Assignee: BBT Innovations LLC, Glen, MT (US)

( * ) Notice: Subject to any disclaimer, the term of this patent is extended or adjusted under 35 U.S.C. 154(b) by 0 days.

(21) Appl. No.: 15/180,060

(22) Filed: Jun. 12, 2016

Related U.S. Application Data

(60) Provisional application No. 62/175,021, filed on Jun. 12, 2015.

(51) Int. Cl.
  *G02C 3/00* (2006.01)

(52) U.S. Cl.
  CPC ............ *G02C 3/006* (2013.01); *G02C 3/003* (2013.01); *G02C 2200/16* (2013.01); *G02C 2200/20* (2013.01); *G02C 2200/24* (2013.01)

(58) Field of Classification Search
  CPC .... G02C 3/003; G02C 2200/26; G02C 3/006; G02C 5/2236; G02C 5/2254; G02C 5/2263
  USPC ......... 351/156, 157; 2/452; 24/3.3; D16/107
  See application file for complete search history.

(56) References Cited

U.S. PATENT DOCUMENTS

| | | | | |
|---|---|---|---|---|
| 5,898,472 A | * | 4/1999 | Oshikawa | G02C 3/02 351/156 |
| 6,918,669 B1 | * | 7/2005 | Tamborrino | G02C 3/04 242/380 |
| 7,255,436 B2 | * | 8/2007 | Tracy | G02C 3/02 2/209.13 |
| 9,354,454 B1 | * | 5/2016 | Tharp | G02C 3/006 |
| 2004/0051845 A1 | * | 3/2004 | Steere | G02C 3/003 351/157 |

* cited by examiner

*Primary Examiner* — Hung X Dang
(74) *Attorney, Agent, or Firm* — John M. Hammond; Patent Innovations LLC

(57) ABSTRACT

An eyewear retention device is disclosed that includes a length of resilient braided or monofilament line, terminating at each end in a tapered, rubberized retention tubing. One or more retractable spring loaded mechanisms have a locking mechanism for easy extraction and retraction back and forth by simply pulling on said line. The combination of the resilient line and the mechanisms produces a tensioned arc such that in addition to retaining eyeglasses around wearers head when in use when not in use with a simple pull on said line, the retention device forms a suspended arc over the wear's upper torso such that the device does not contact the wear's upper torso or their vestment when donned over a wear's eyes.

13 Claims, 24 Drawing Sheets

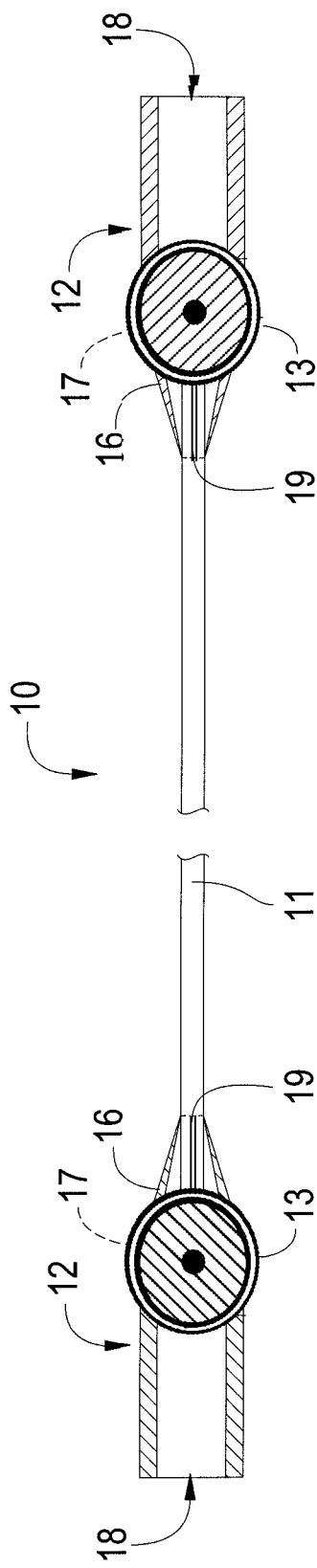
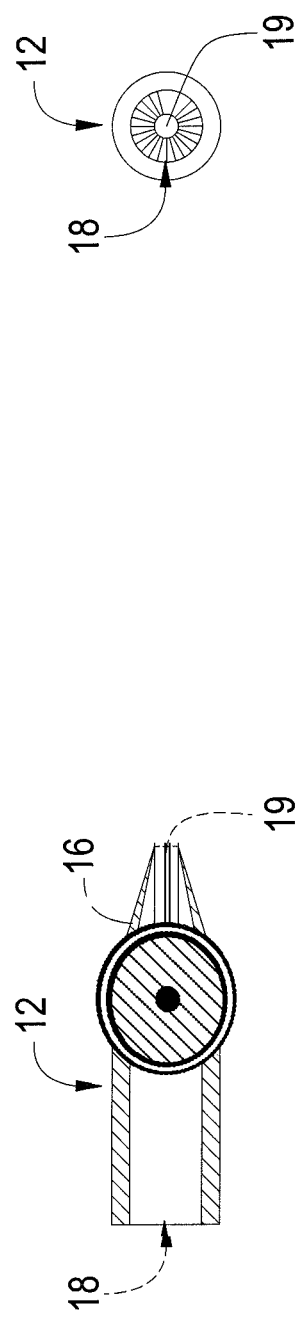
FIG. 3A
FIG. 3B
FIG. 3C

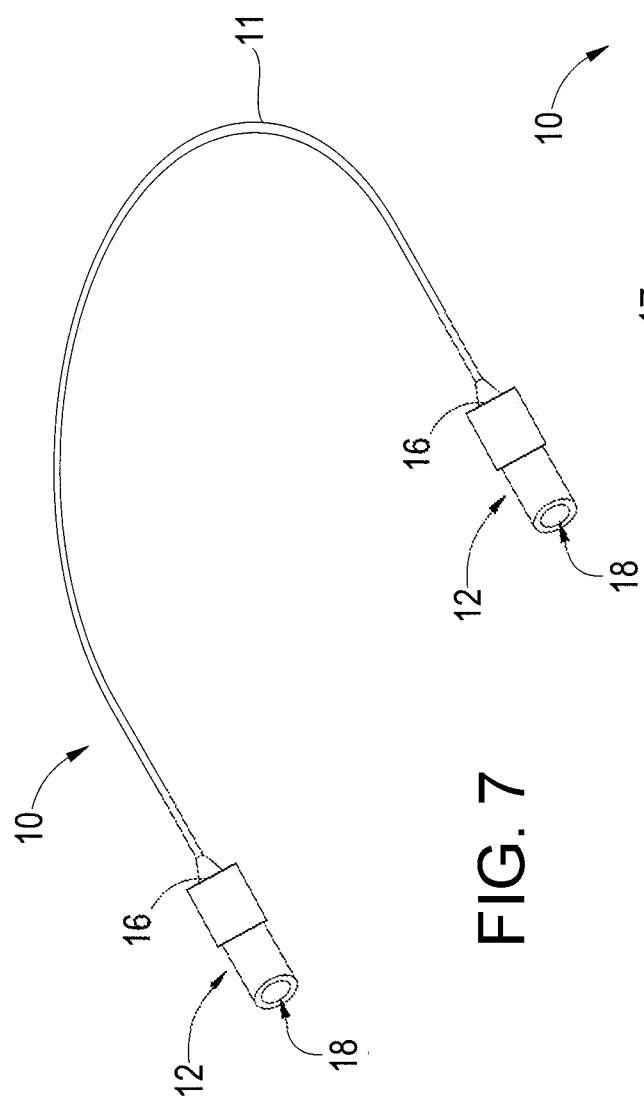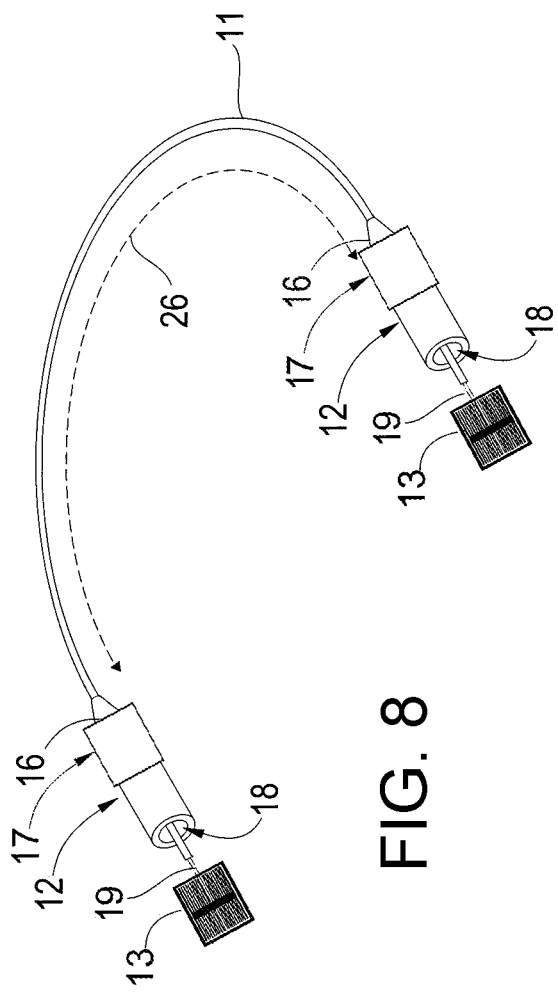

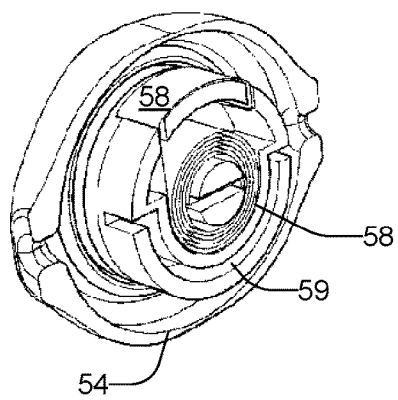
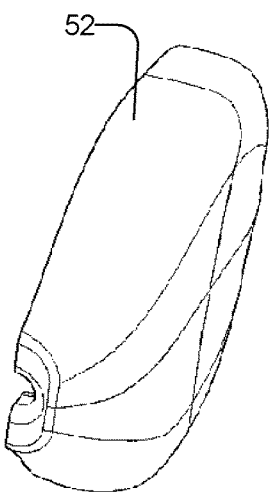
FIG. 25
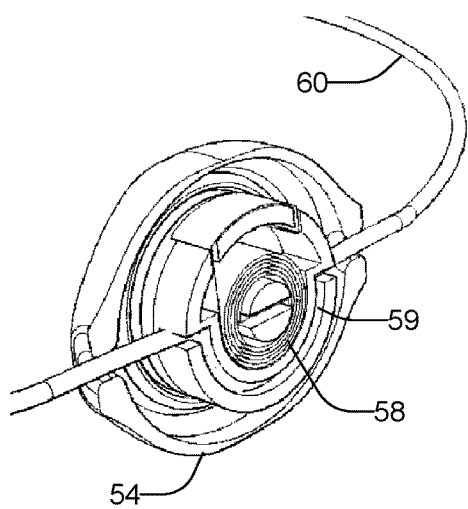
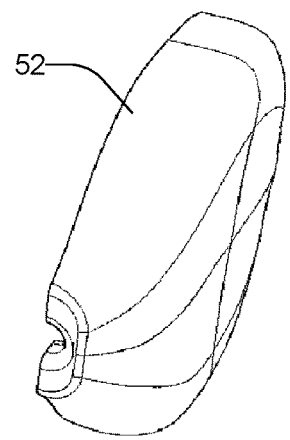
FIG. 26

RETRACTABLE EYEWEAR RETENTION DEVICE

BACKGROUND OF THE INVENTION

1. Field of the Invention

The present invention relates to eyewear, such as eyeglasses, sunglasses, or safety glasses, and, more specifically, to an eyewear retention device.

2. The Prior Art

For many decades, probably longer, eyewear users have attached strings, cloth-based retainers, lightweight chains, and small ropes to eyewear to loosely retain them upon a wearer's neck region when not positioned upon the wearer's head. Several years ago, retention systems ("Cablz") were introduced which are essentially a coated piece of cable having a rubber tubular retention portion into which eyewear temples slip into and an arc portion that extends around the rear of a user's head.

Eyewear retention systems (i.e. Cablz) immediately became popular with the general public, athletes, skiers, fisherman, and hunters who utilize sunglasses with strongly tinted lenses to provide protection from intense glare and reflected light off water, ice, and snow, and other reflective surfaces in brilliant sunlight. As a user transitions from direct sunlight to a shady or darker environment, they can use the eyewear retention system to hang their eyewear from their neck region. However, with the advent of more stylized eyewear, and especially the darker tinted glass and plastic (e.g. polycarbonate) lenses, especially in non-prescription type sunglass lenses, wearer's are more frequently required to dismount their glasses in order to read close-up materials or inspect materials that are viewed in relatively low-light conditions. For example, it is quite common for a fishermen, skippers, or first mate deckhands to discard their glasses when going underneath the top deck of a boat to retrieve fishing tackle, read charts, or view other navigational aids during bright sunlight hours in order that they may be able to see the items they are utilizing. Hence, Cablz, and other types of retained devices have become popular for outdoorsmen and sportsmen alike seeking to provide the safety and proximity retention of their glasses while providing the flexibility to discard them quickly and utilize their eyes in relatively lowlight conditions.

Unfortunately, the existing eyewear retention devices place a burden upon the wearer in that they protrude past the back of the head when eye-wear is on this creates problems when sitting back in chairs putting hooded clothing on stocking hats etc. Also, cloth retention devices soak up a persons sweat that can cause a foul odor after multiple uses. Some retention devices have two tabs provided on the retainer for the cable to be tightened around a persons head while the glasses are in use. These devices still leaves to much space from the back of the head which will be hindered when wearing clothing or sitting in chairs etc. These locations are inconvenient because the retention device itself becomes potentially in the way of the wearer's vestment which might hinder the re-application or the re-mounting of the glasses over the wearer's eyes. The tightened cable also makes it too hard to fit eyewear back on the wearer for the cable is too small to fit over the chin and face. When trying to loosing or pull the tabs on the cable or pull tabs to put it back to the original length you have to spread the arms of the eye-wear which is very inconvenient and also puts the expensive eyewear in jeopardy of breaking.

Hence, what is needed is an eyewear retention device that maintains the full utility of the retention objective for eyewear, while avoiding all of the difficulties of past eyewear retention devices.

SUMMARY OF THE INVENTION

This patent discloses and claims a useful, novel, and unobvious invention for a reractable eyewear retention device in the eyewear field.

An eyewear retention device is disclosed in one embodiment that includes a length of resilient braided or monofilament line, terminating at each end in a tapered, rubberized retention tubing, including retractable spring loaded mechanism or mechanism's molded in the ends of the retention tubing with a locking mechanism for easy extraction and retraction back and forth by simply pulling on said line. The combination of the resilient line and the mechanism or mechanism's produces a tensioned arc such that in addition to retaining eyewear around wearers head when in use when not in use with a simple pull on said line, the retention device forms a suspended arc over the wear's neck and upper torso region.

BRIEF DESCRIPTION OF THE DRAWINGS

FIGS. 3A-3C shows the embodiment of the present invention 10 shown in FIGS. 2A-2F in more detail;

FIGS. 7 and 8 show exemplary construction of the retention tubing portion of the embodiment shown in FIGS. 2A-2F;

FIGS. 10-32 show an embodiment of the present invention utilizing a single retraction mechanism 50.

FIG. 10 shows the major parts of this embodiment as a wire drawing.

FIG. 11 shows this embodiment assembled in a perspective view.

FIG. 12 shows this embodiment in a top view.

FIGS. 14 and 15 show this embodiment with the front housing removed.

FIG. 16 shows this embodiment in a fully exploded side view.

FIGS. 17-20 show this embodiment in a fully exploded perspective view.

FIGS. 21-22 show this embodiment in fully exploded perspective views with the line or cable removed.

FIGS. 23-28 are perspective views showing the assembly of this embodiment of the present invention.

FIGS. 29-32 are different views of the spool.

DETAILED DESCRIPTION

Figure 1A:
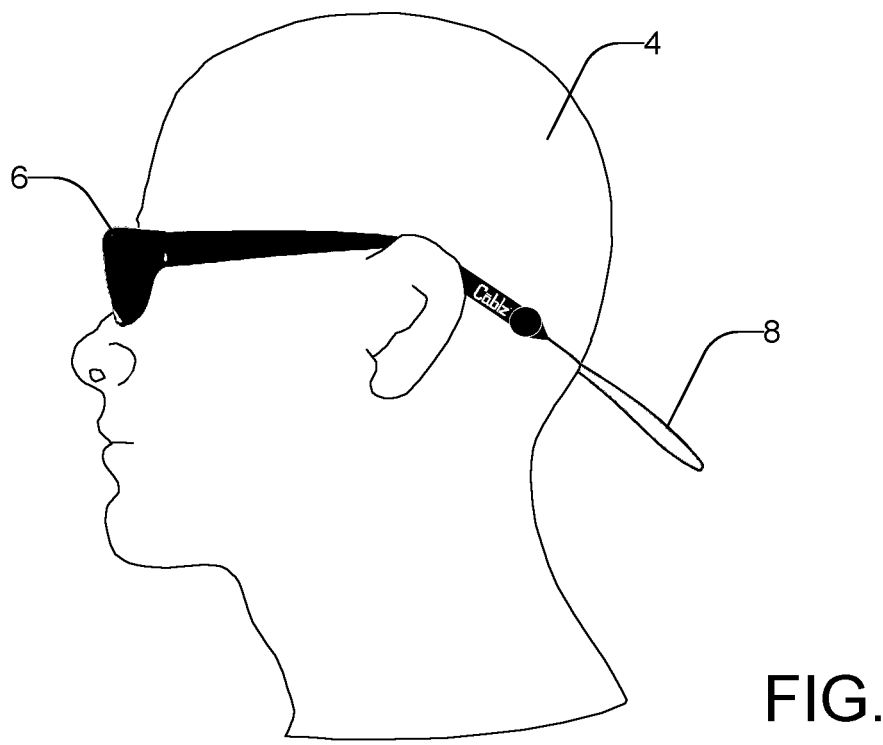
FIGS. 1A and 1B show an eyewear retention device, in accordance with the prior art.
Figure 1B:
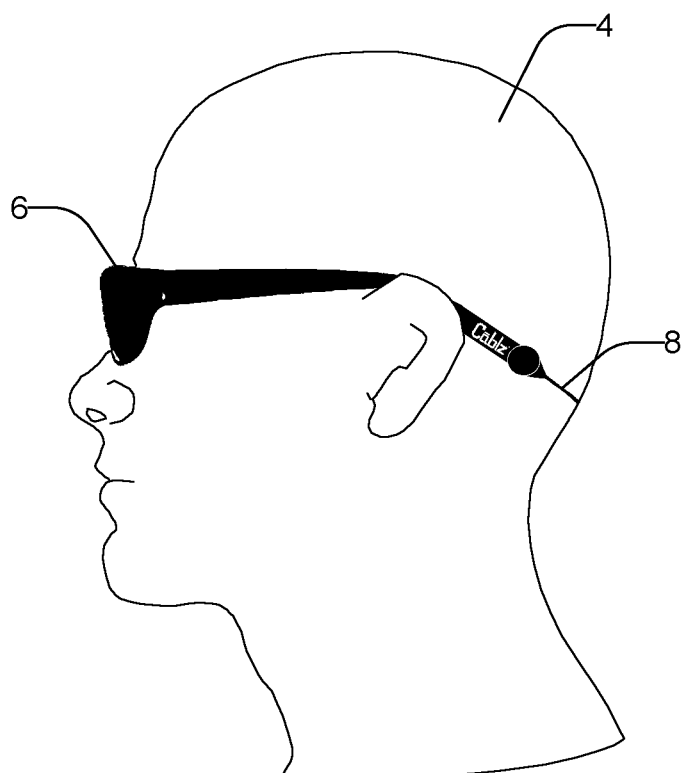

Referring to the drawings for a better understanding of the function and structure of the invention, FIGS. 1A and 1B show an eyewear retention device, in accordance with the prior art. Eyewear 6 is held onto the head 4 of a person with a prior art retention device 8. For example, the prior art retention device 8 may have tabs that can be pulled to tighten the prior art retention device 8 around the head 4. FIG. 1A shows the prior art retention device 8 loose around the head 4, and FIG. 1B shows the prior art retention device 8 tightened around the head 4.

Figure 2A:
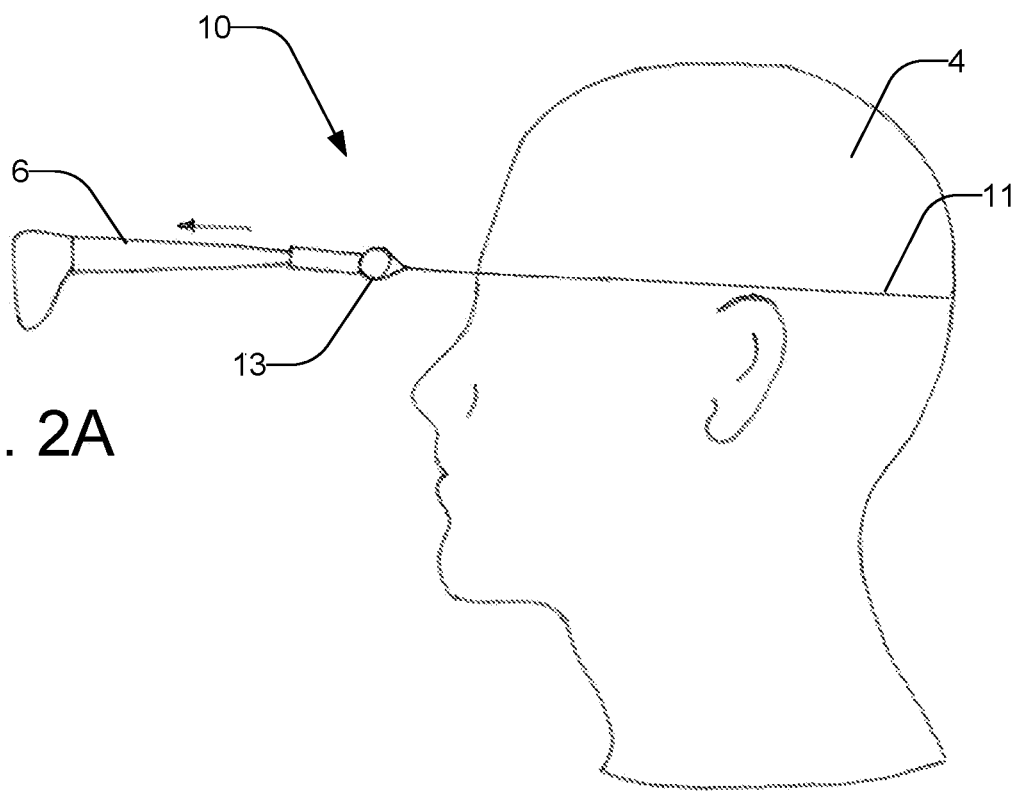
FIGS. 2A-2F show one embodiment 10 of the present invention.
Figure 2B:
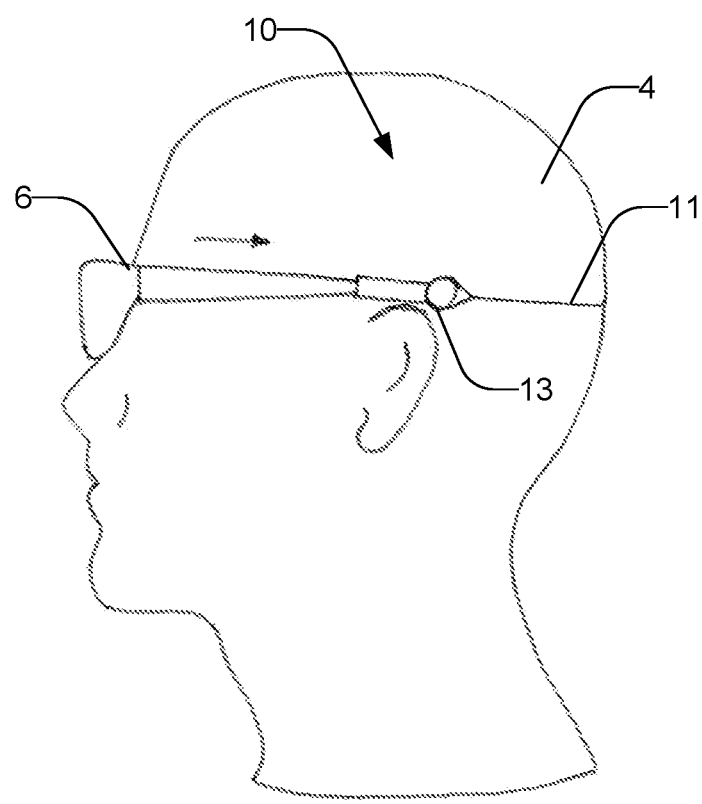
Figure 2C:
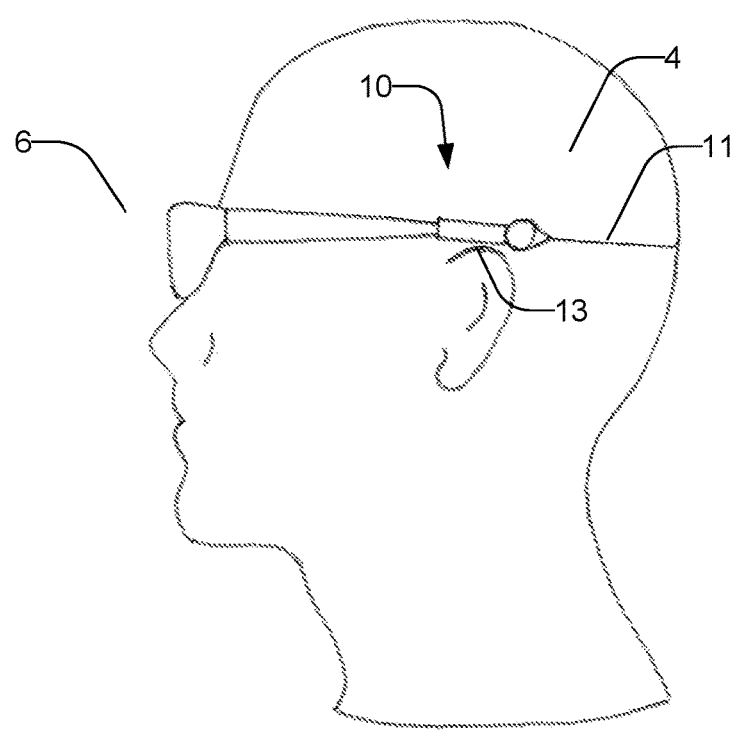
Figure 2D:
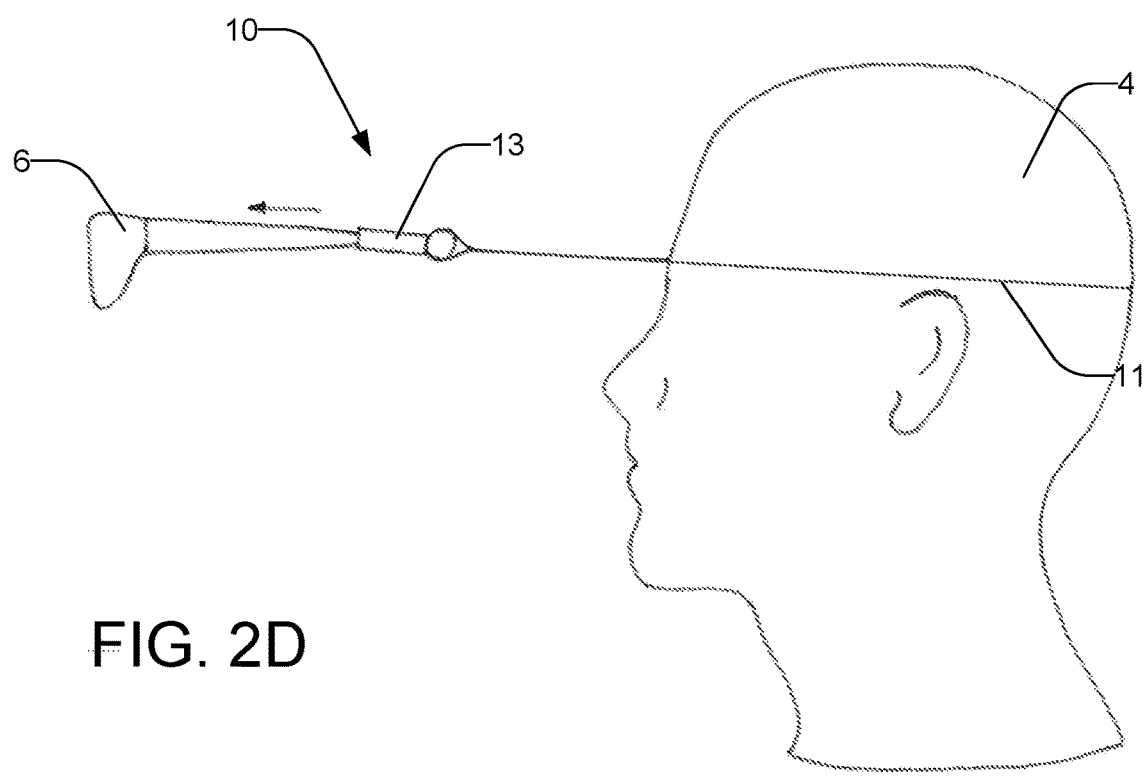
Figure 2E:
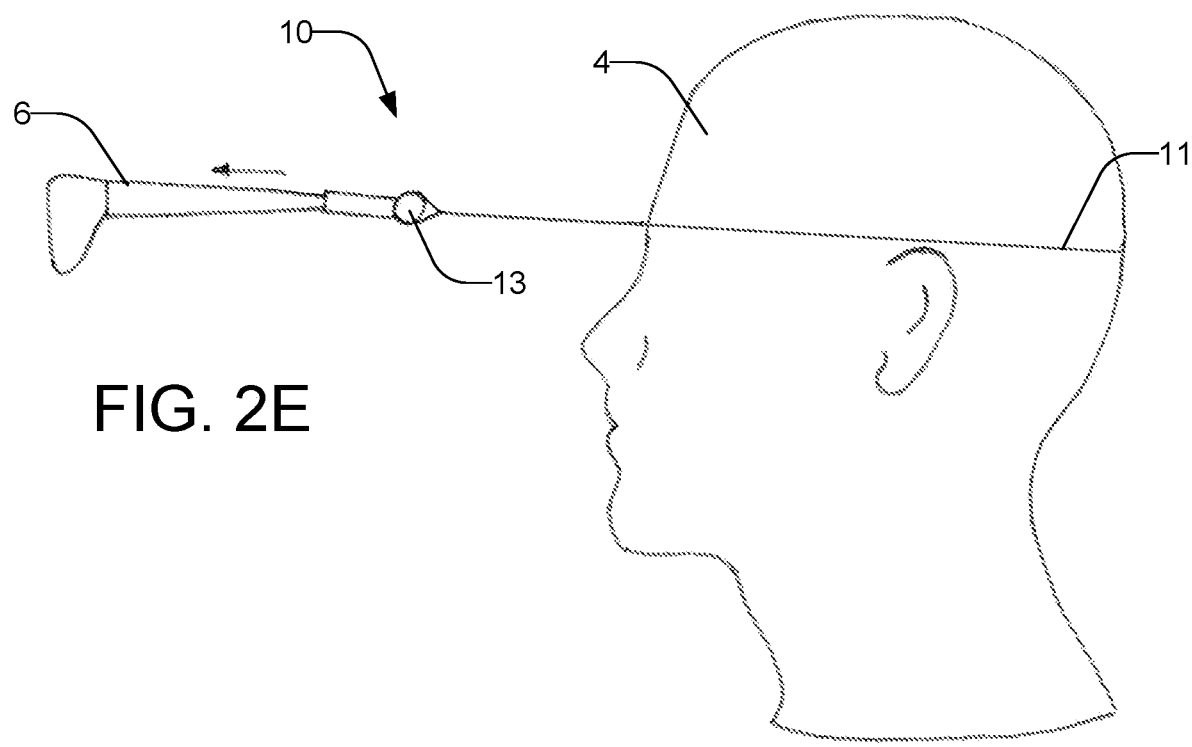
Figure 2F:
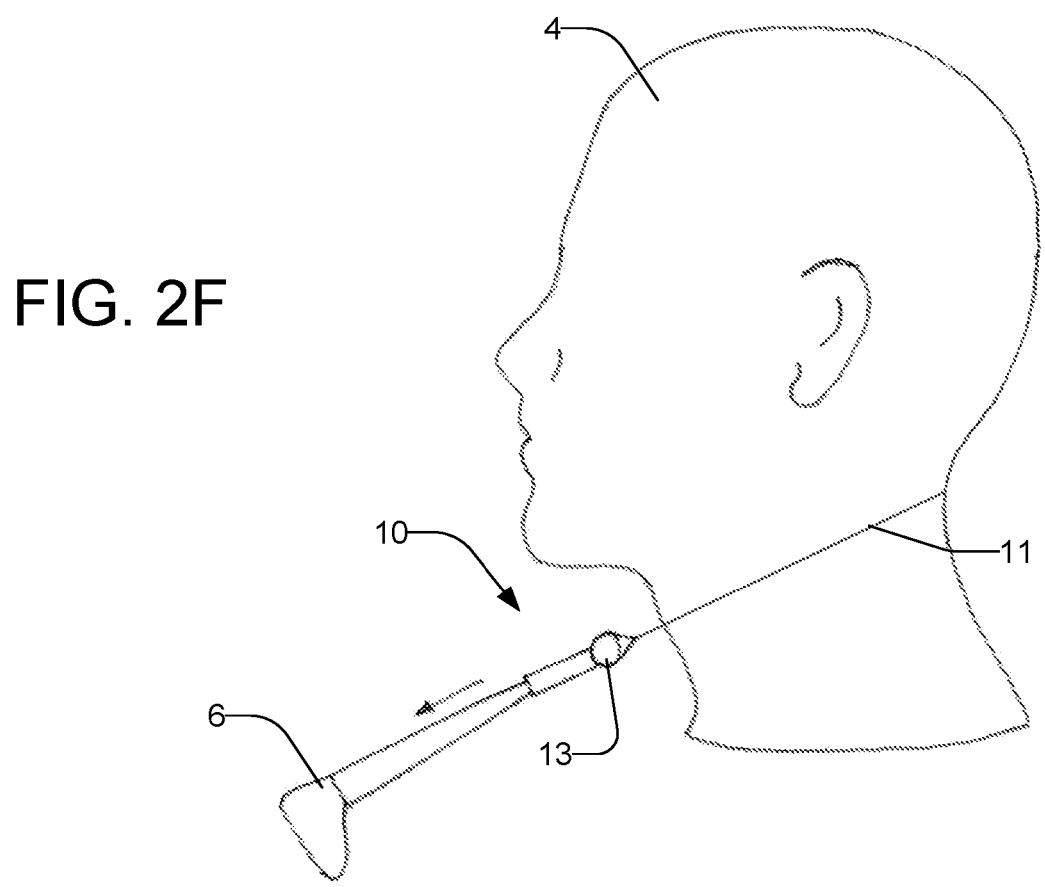

FIGS. 2A-2F show one embodiment 10 of the present invention. The embodiment 10 consists primarily of a pair of spring loaded retractable spools 13 that reel in and let out line 11 that may go behind the head 4 of a person. The spring loaded retractable spools 13 are connect to and retain the eyewear 6. FIG. 2A shows the embodiment 10 with the line 11 a fully extracted position. At that point, it automatically locks into place. Then, when pulled out slightly, the two spring loaded retractable spools 13 retract, resulting in FIGS. 2B and 2C, which shows the line 11 fully retracted and snug around the head 4. FIGS. 2D and 2E shows the line 11 fully extracted and locked. FIG. 2F shows the eyewear 6 dropped down around the neck of the person, in a fully locked and extracted position.

FIGS. 3A-3C shows the embodiment 10 of the present invention shown in FIGS. 2A-2F in more detail. This embodiment 10 includes a coated line 11 having a tightly wound braided structure and coated with a relatively frictionless plastic or foam insulation for floatability. The line 19 is of sufficient diameter to fit in the spring loaded retractable spool for easy extraction and retraction of internal line. The coating of line 11 will not enter the mechanism or mechanisms for the foam coating diameter will stop at the tapered ends of the retention tube 16. Embodiment 10 includes retention tubes 12 at each end of coated line 11. Each tube 12 includes a temple retention opening 18 having a sufficient diameter to pass over the end portions of a typically sized eyewear temple. Retention tube 12 opening 18 is also sized to exhibit a certain friction characteristics to allow easy sliding of the retention tubing 12 onto the end portion of a typical eyewear temple, while providing sufficient frictional qualities to avoid easy removal. Generally, the retention tubing 12 consists of flexible and resilient rubber, or like compound, and has low friction qualities on its exterior. The retention tubing 12 includes an outer case 17 to house the spring loaded retractable spool 13 before the tapered portion of the retention tubing 16 cooperatively sized to insert or be molded within the retention tubing 12 while maintaining continual circumferential contact around the coated line. Once the spool mechanism 17 has been molded in the retention tube housing the coated line will stop at the tapered portion 16. Once the spool mechanism 17 has been molded inside the retention housing the line 11 emerges through opening 19, and then met by coated line 11 that prevents the coated line to pass into the spool mechanism.

Figure 4A:
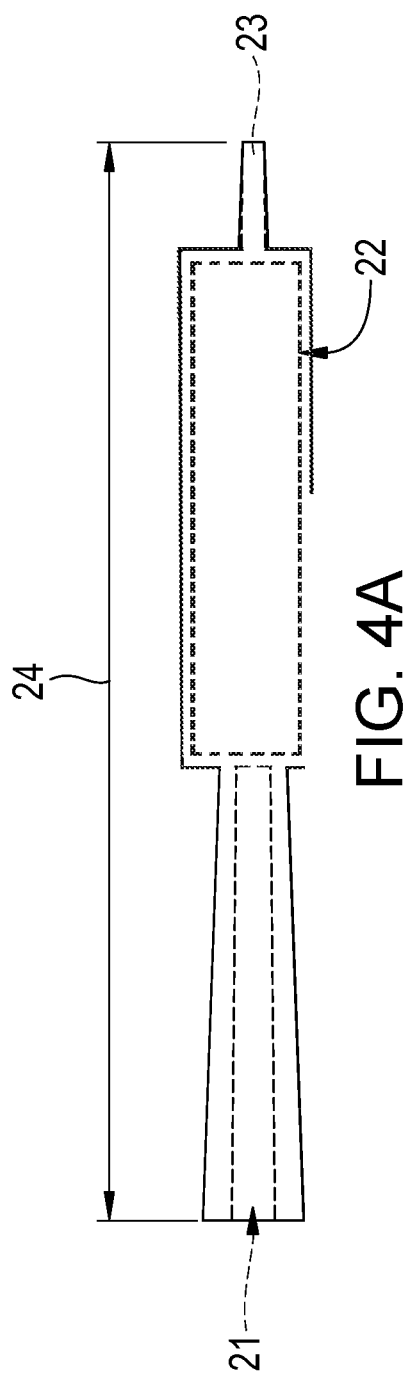
FIGS. 4A-4C show a second embodiment, in accordance with the present invention.
Figure 4B:
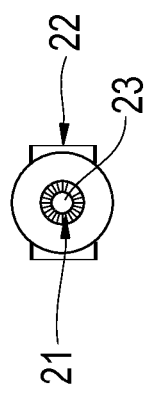
Figure 4C:
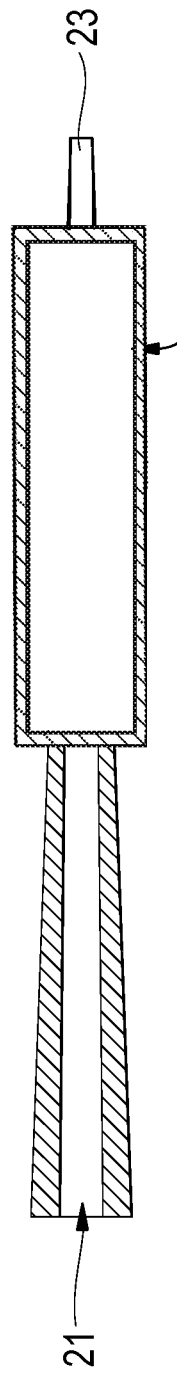

FIGS. 4A-4C show a second embodiment, in accordance with the present invention. In these FIGs, one may see a second embodiment of retention tube 22. To accommodate some eyewear having relatively thin temples, retention tube 22 may be reshaped to include a fully tapered conical structure from opening 21 to aperture 23. As may be seen, a hollow interior of retention tube 22 is sized to accommodate the spring loaded retractable spool. The elongated conical shape so that temples of more slender sizes may be inserted within opening 21 and slid along the interior of retention tube 22 until sufficient circumferential frictional force is applied to the end of the inserted temple to stop the progress of the temple within the hollow interior of the retention tube 22. This shape allows for varying applicability for different size temples and also provides additional retention security by increasing circumferential friction on temples inserted within but will not pass the hollow interior of the retention tube 22.

Figure 5:
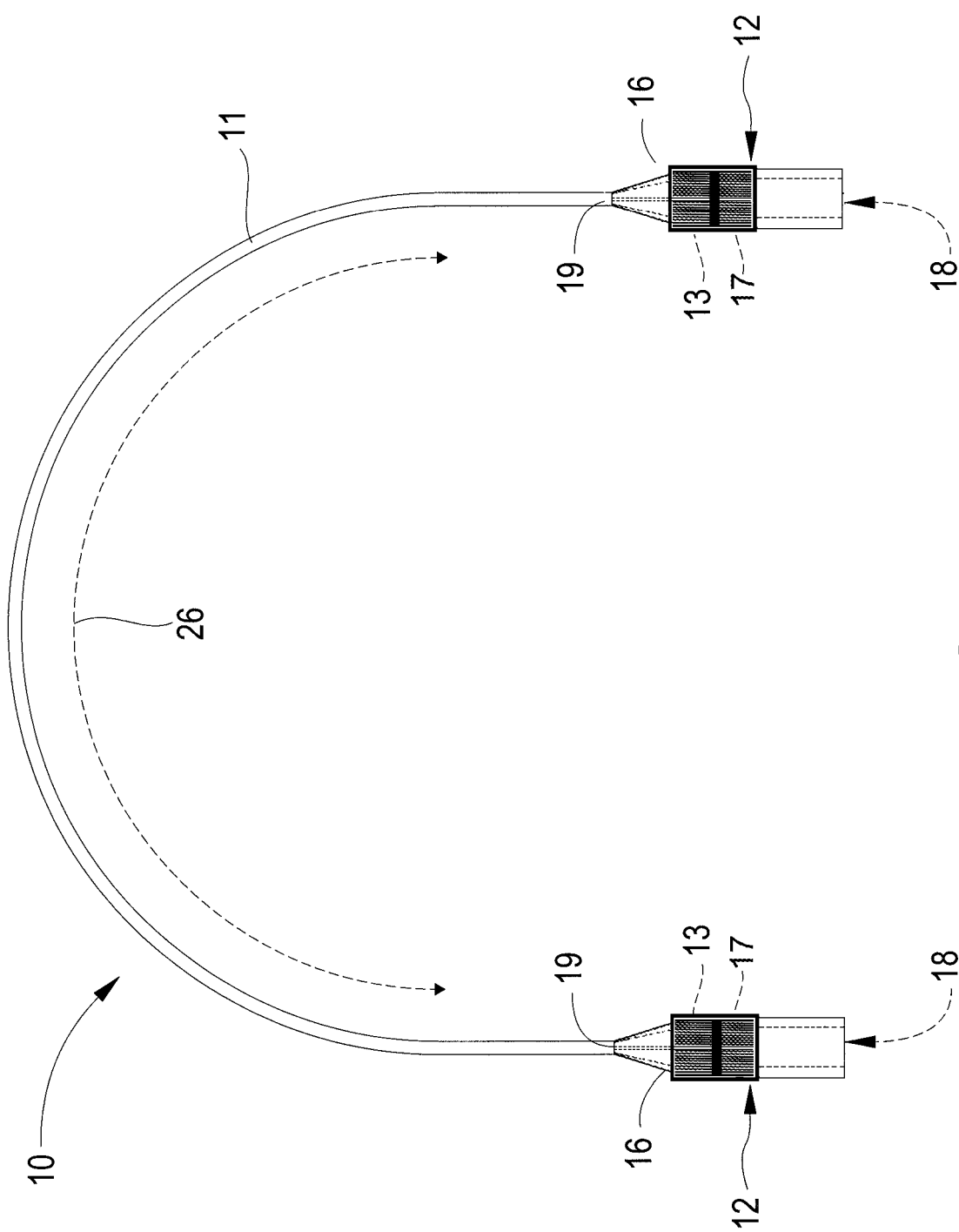
FIG. 5 shows the embodiment shown in FIGS. 2A-2F conformed to a substantially semi-circular or arc shape.

FIG. 5 shows the embodiment 10 shown in FIGS. 2A-2F conformed to a substantially semi-circular or arc shape 26. Due to the resiliency of the relatively frictionless plastic or foam outer insulation for floatability 11, maintains the arc shape 26 when installed upon the temples of eyewear. The line 19 is of sufficient diameter to fit in the spring loaded retractable spool 13 for easy extraction and retraction of internal line. The coating of line 11 will not enter the mechanism or mechanisms for the foam coating diameter will stop at the tapered ends of the retention tube 16. Embodiment 10 includes retention tubes 12 at each end of coated line 11. Each tube 12 includes a temple retention opening 18 having a sufficient diameter to pass over the end portions of a typically sized eyewear temple. Retention tube 12 opening 18 is also sized to exhibit a certain friction characteristics to allow easy sliding 12 onto the end portion of a typical eyewear temple, while providing sufficient frictional qualities to avoid easy removal. Generally, the retention tubing 12 consists of flexible and resilient rubber, or like compound, and has low friction qualities on its exterior. The retention tubing 12 includes an outer case 17 to house the spring loaded retractable spool 13 before the tapered portion of the retention tubing 16 cooperatively sized to insert or be molded within the retention tubing 12 while maintaining continual circumferential contact around the coated line. Once the spring loaded retractable spool mechanism 13 has been molded in the retention tube housing the coated line will stop at the tapered portion of the retention tubing 16. Once the spool mechanism 17 has been molded inside the retention housing the line emerges through opening, and then met by coated line 11 that prevents the coated line to pass into the spool mechanism and the retention tubing 16.

Figure 6:
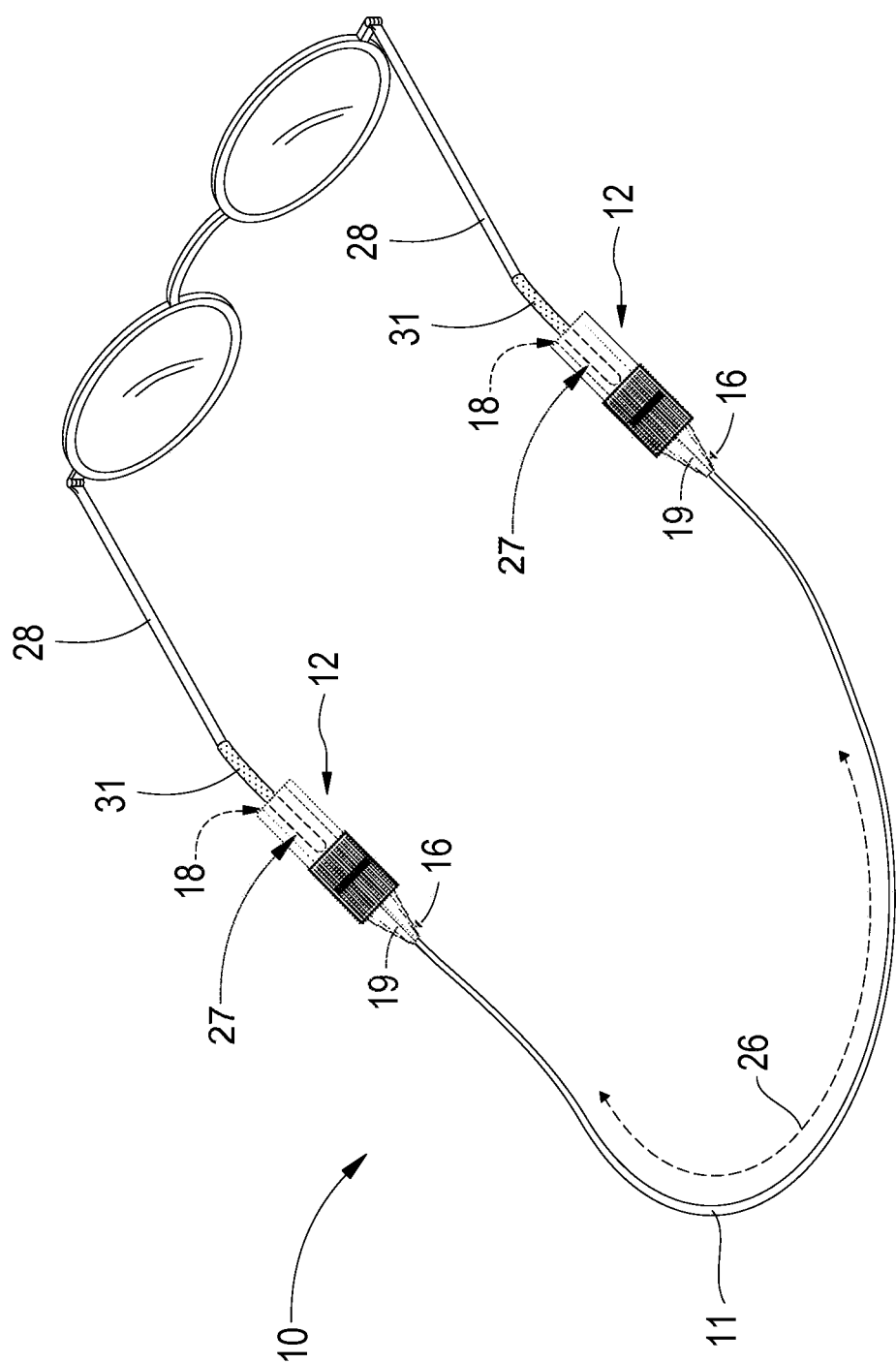
FIG. 6 shows the embodiment shown in FIGS. 2A-2F with eyewear inserted.

FIG. 6 shows the embodiment 10 shown in FIGS. 2A-2F with eyewear 27 inserted. Retention tubing 12 is inserted over end portions of the temples of the shown eyewear 27 until end portions of the temples 31 are fully engaged within the interior of the retention tube 12. A sufficient length including a coated line 11 having a tightly wound braided structure and coated with a relatively frictionless plastic or foam insulation for floatability. The line 11 is provided to allow for the donning of the combination of this embodiment 10 of the present invention and eyewear 28, such as eyeglasses or sunglasses, as the case may be, over a wearer's head 4 while in place, and is sized to accommodate baseball caps and similar sun visor protective head gear.

Figure 9:
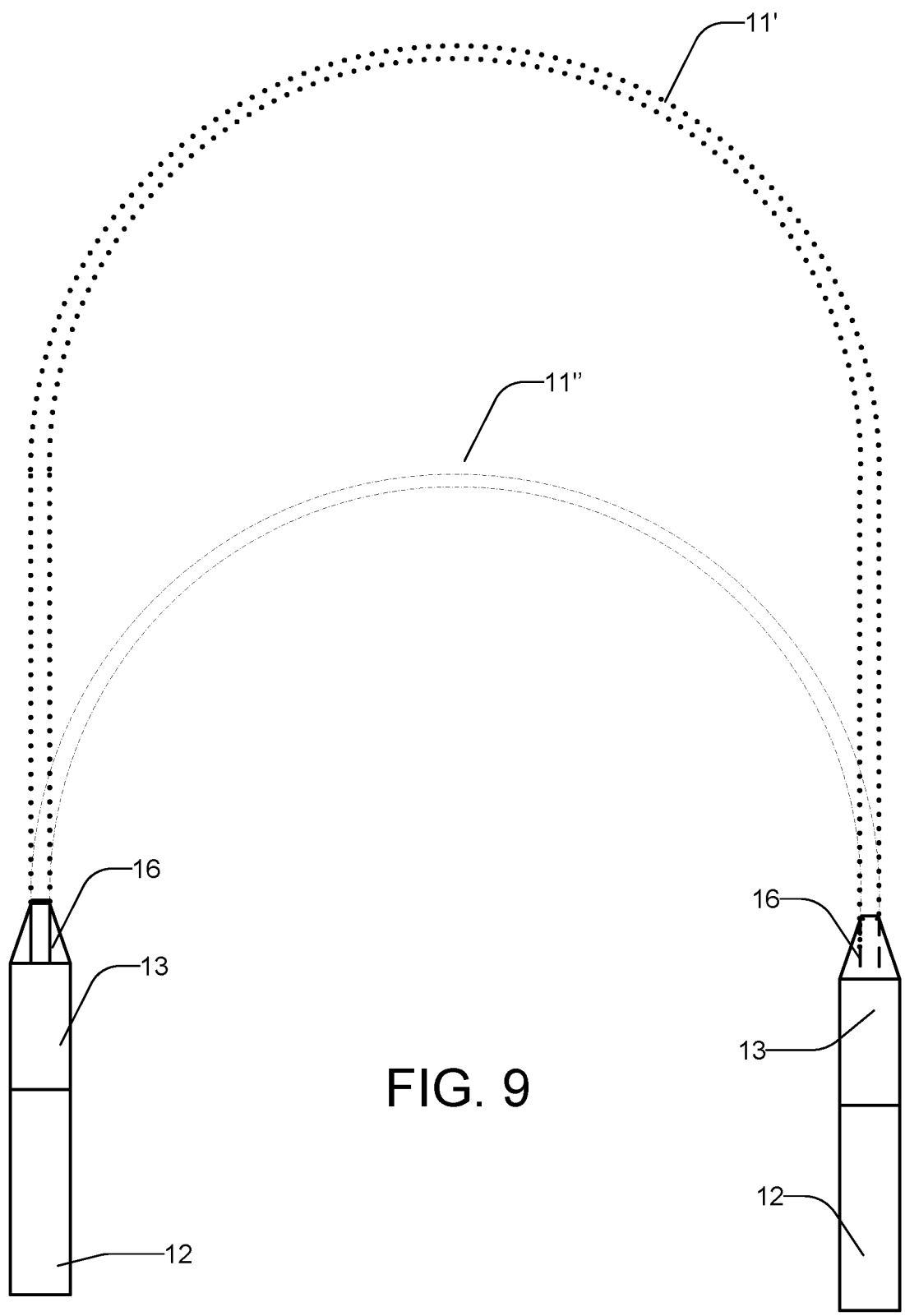
FIG. 9 shows the embodiment shown in FIGS. 2A-2F in two different positions, with the line in a retracted position, and with the line in an extended position.

FIGS. 7 and 8 show exemplary construction of the retention tubing portion of the embodiment shown in FIGS. 2A-2F. FIG. 9 shows the embodiment shown in FIGS. 2A-2F in two different positions, with the line 11' in a retracted position, and with the line 11" in an extended position.

Figure 10:
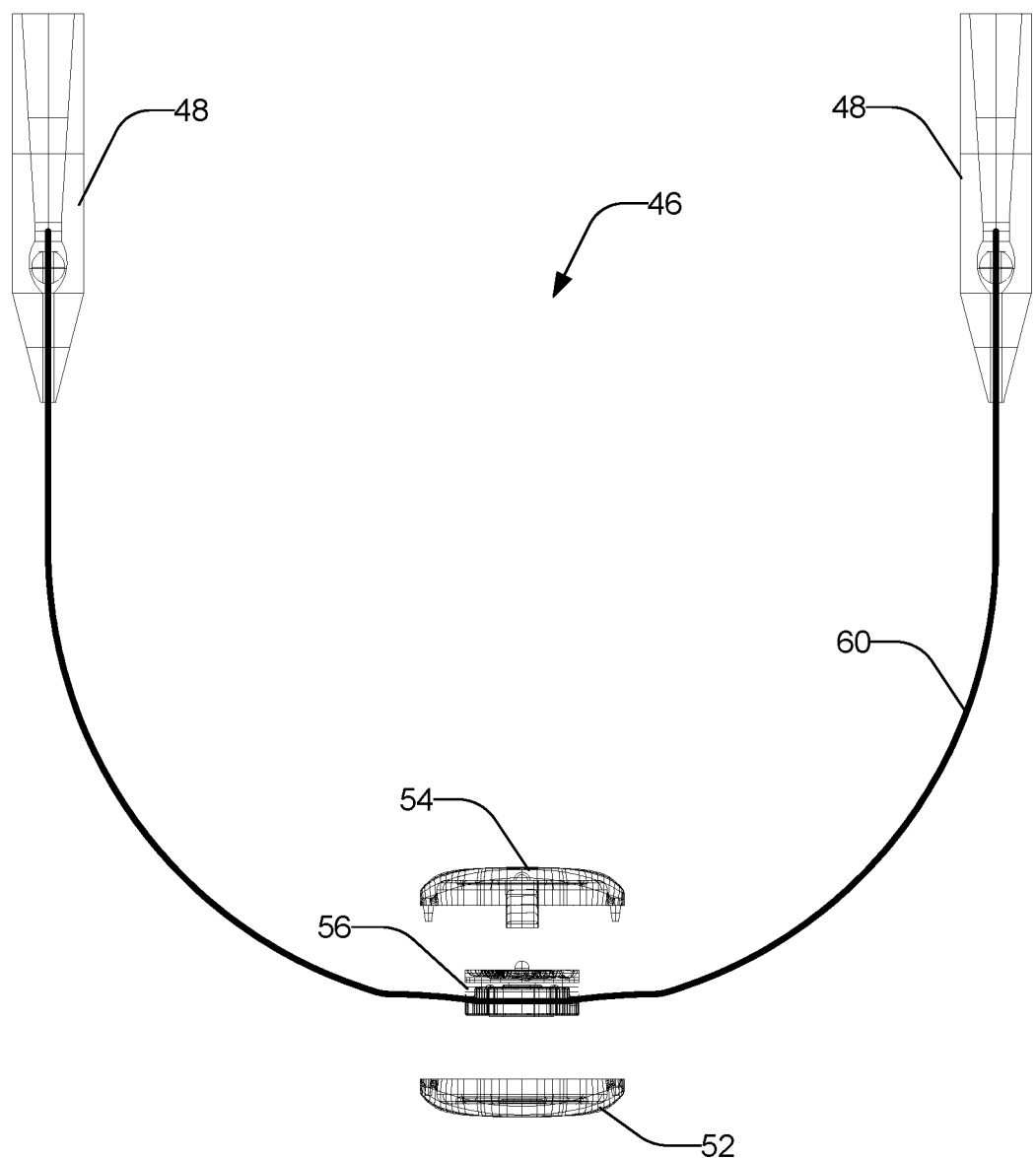
Figure 11:
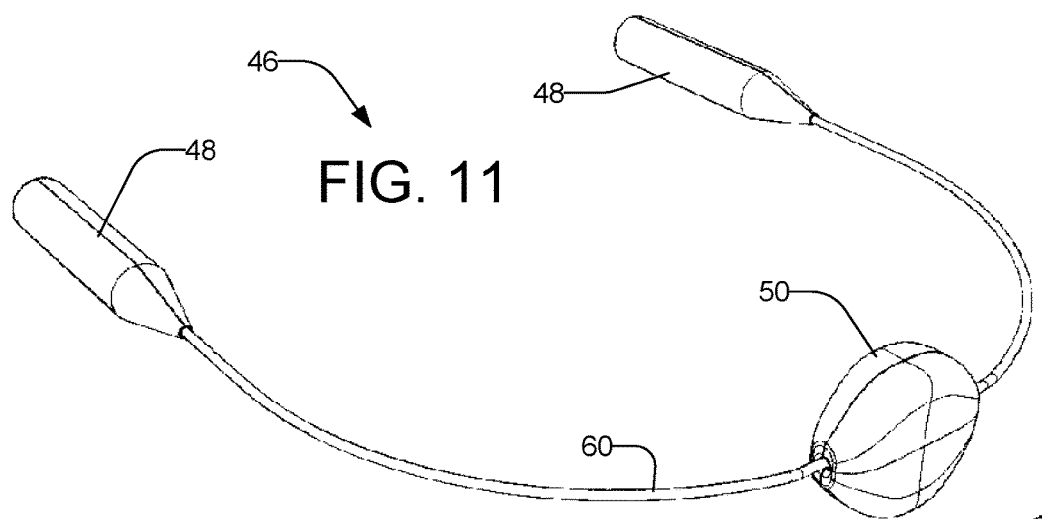
Figure 12:
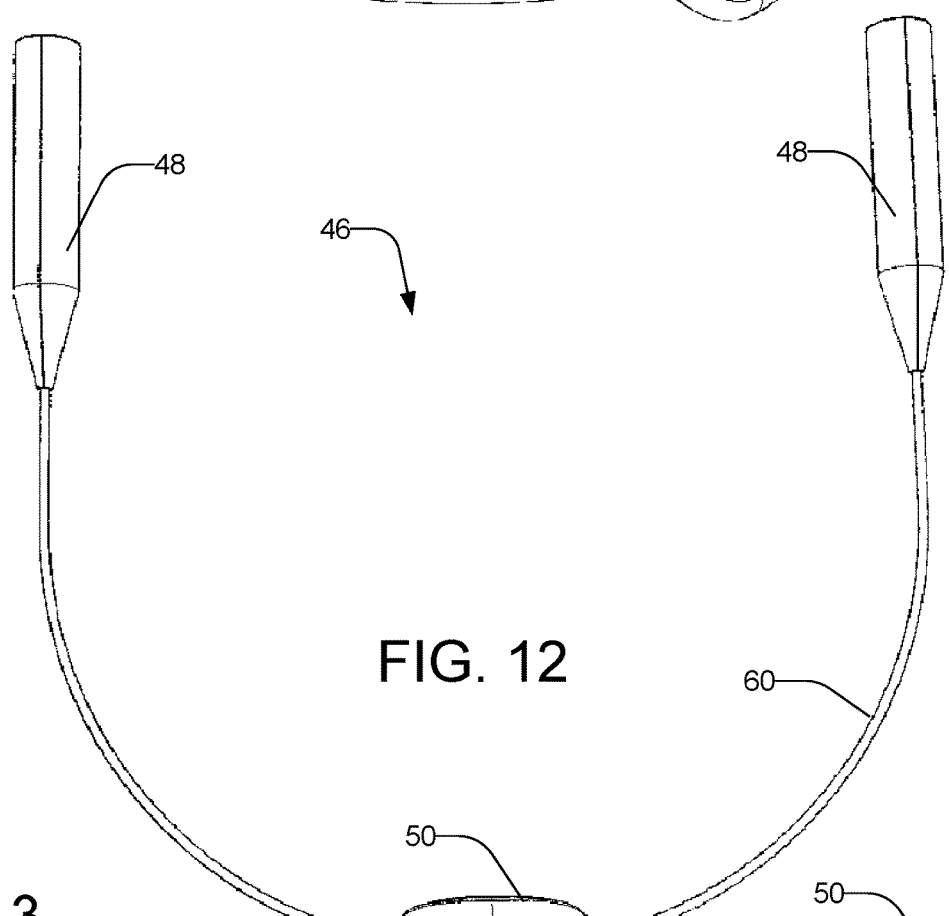
Figure 13:
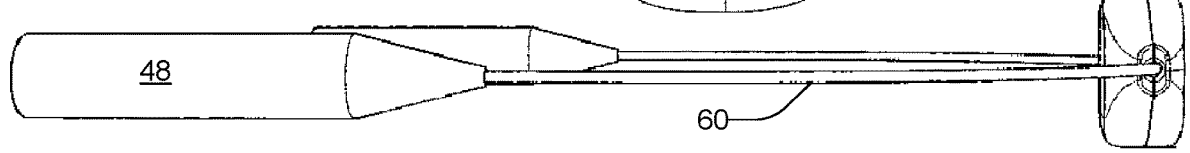
Figure 14:
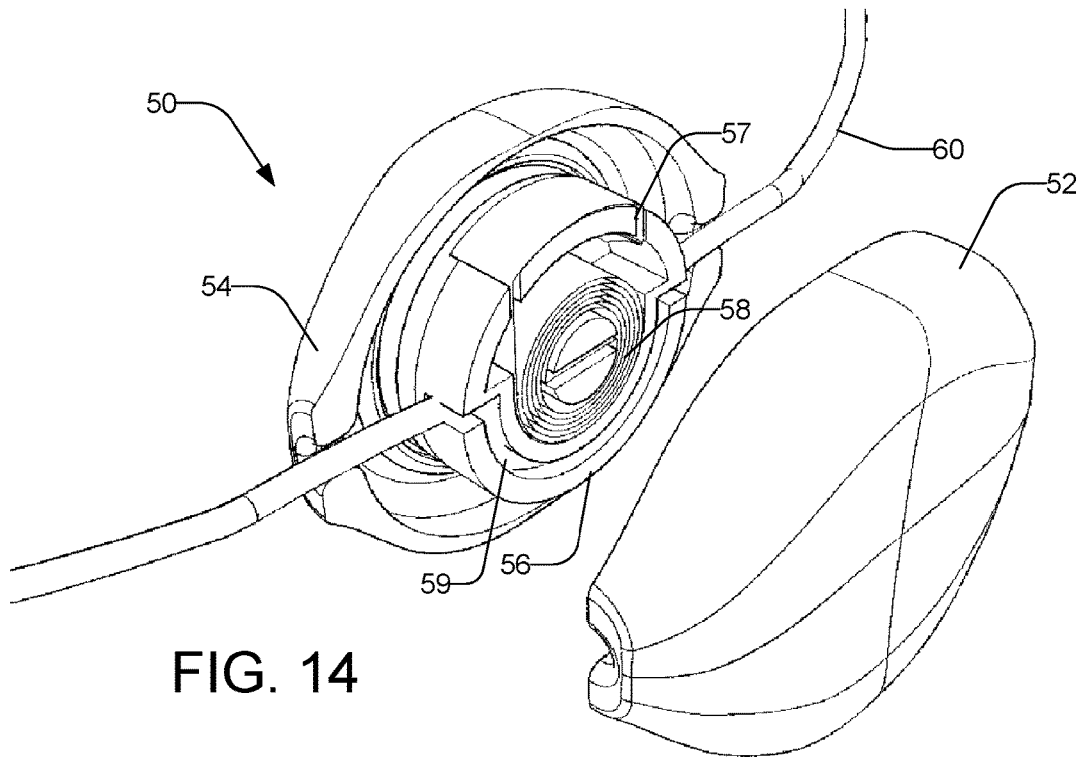
Figure 15:
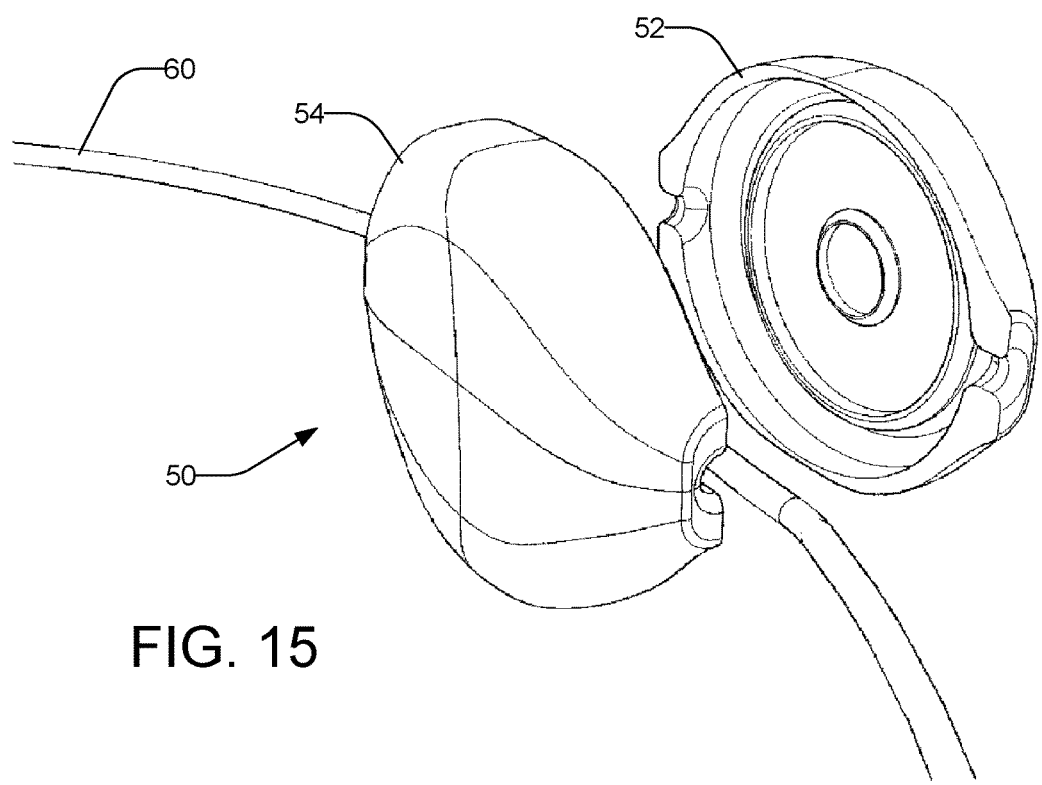
Figure 17:
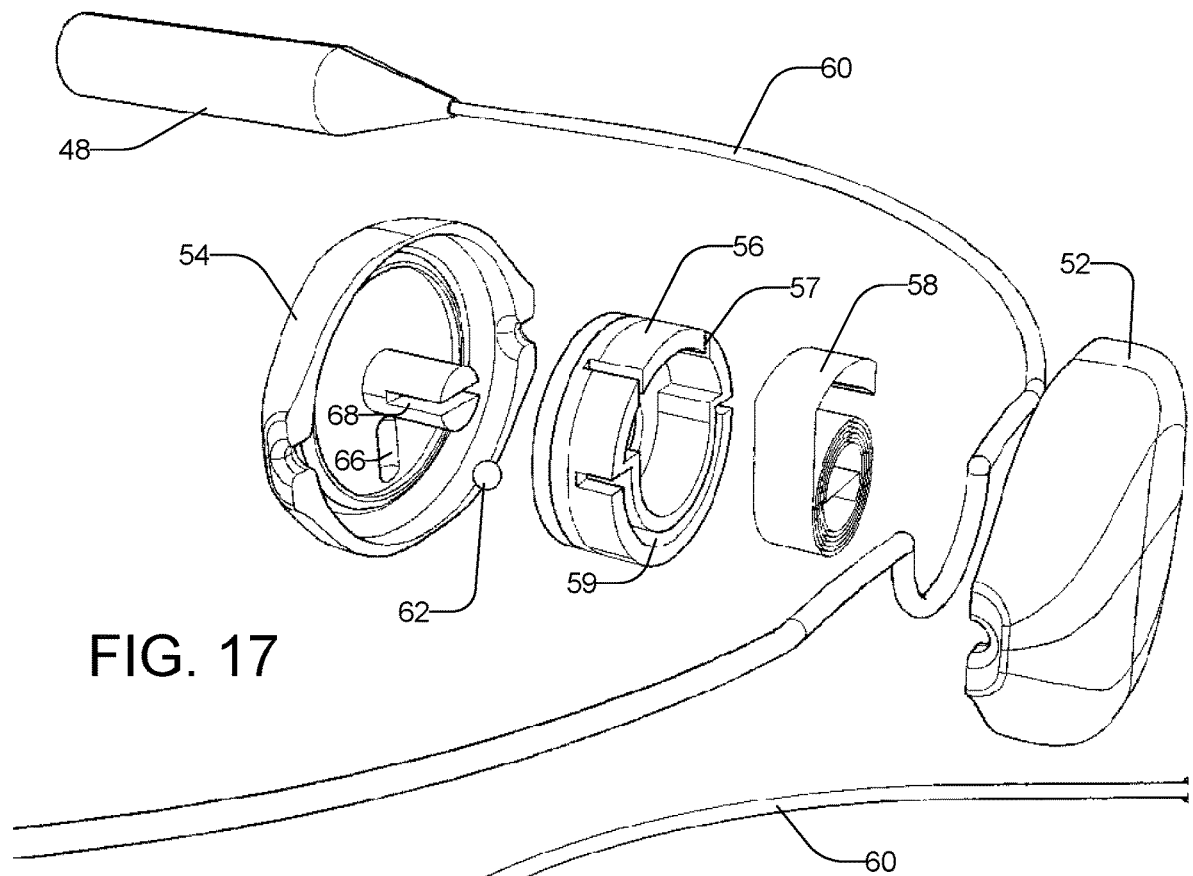
Figure 16:
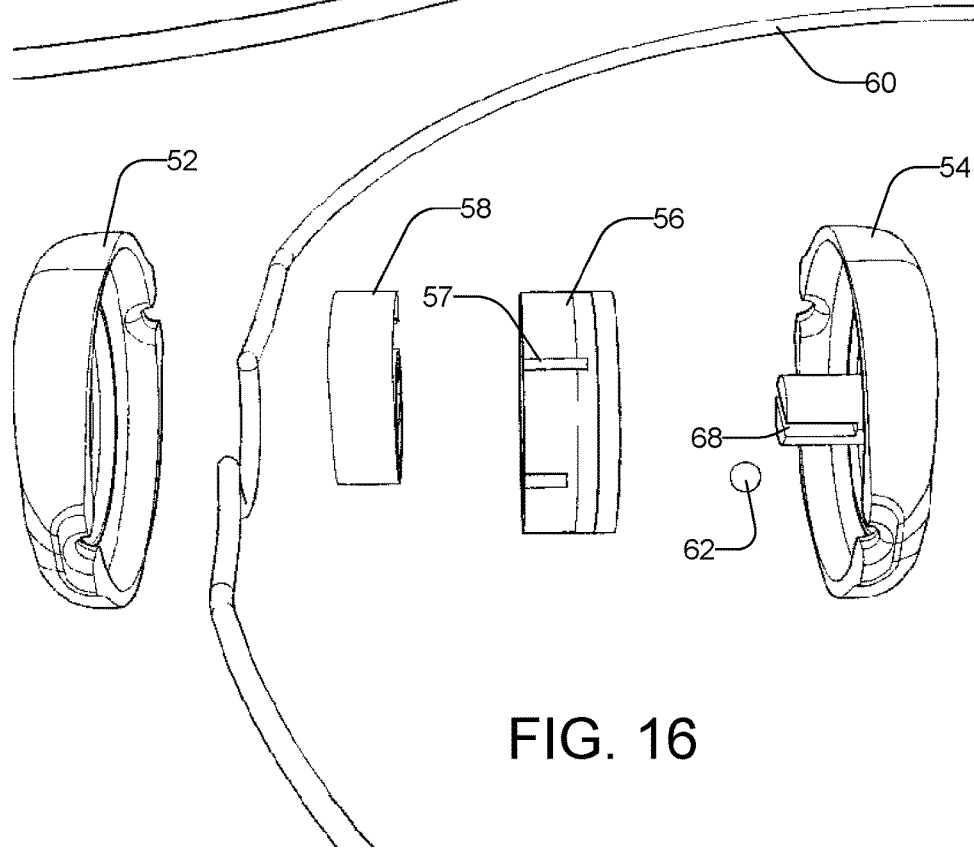
Figure 18:
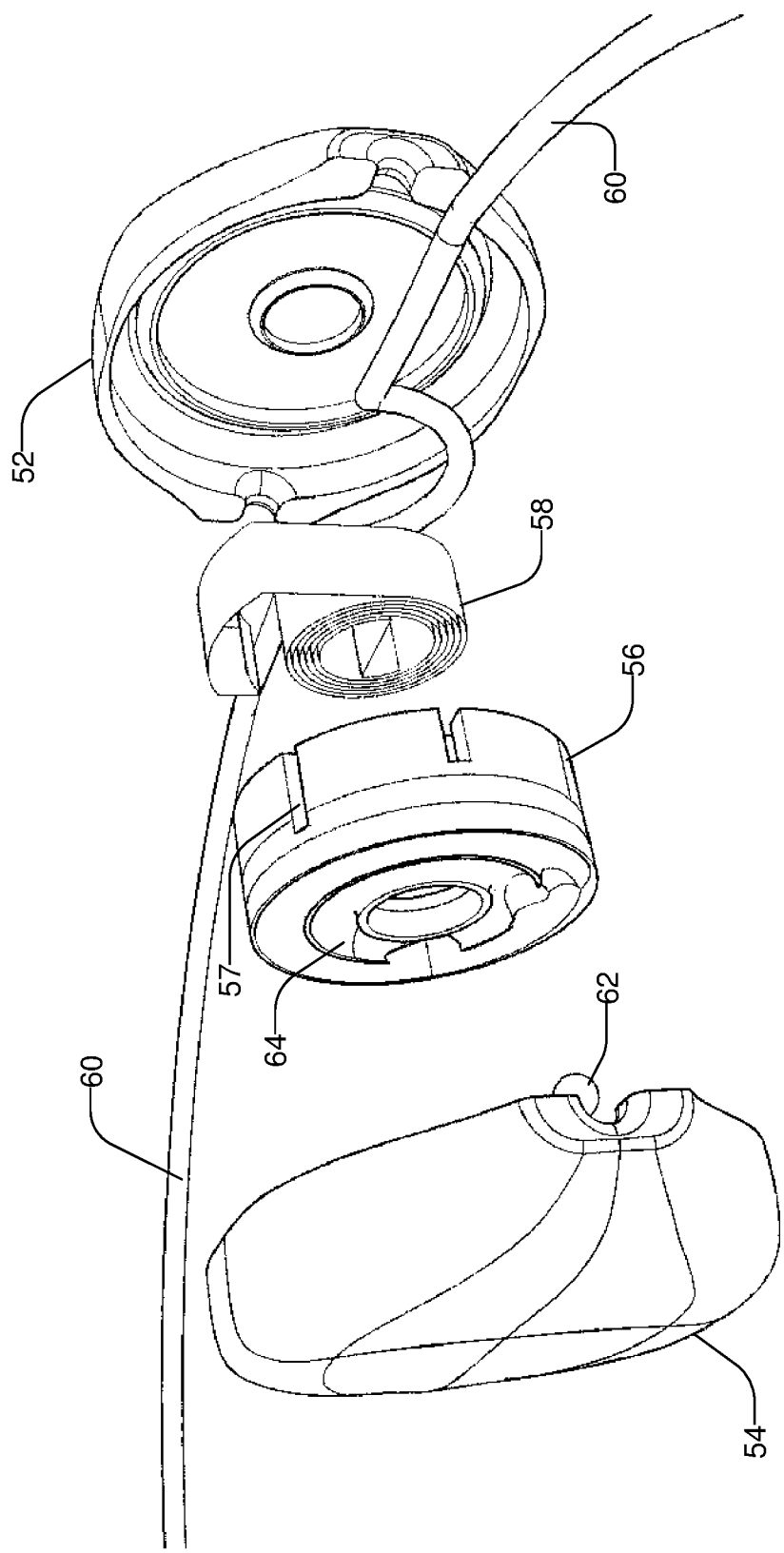
Figure 19:
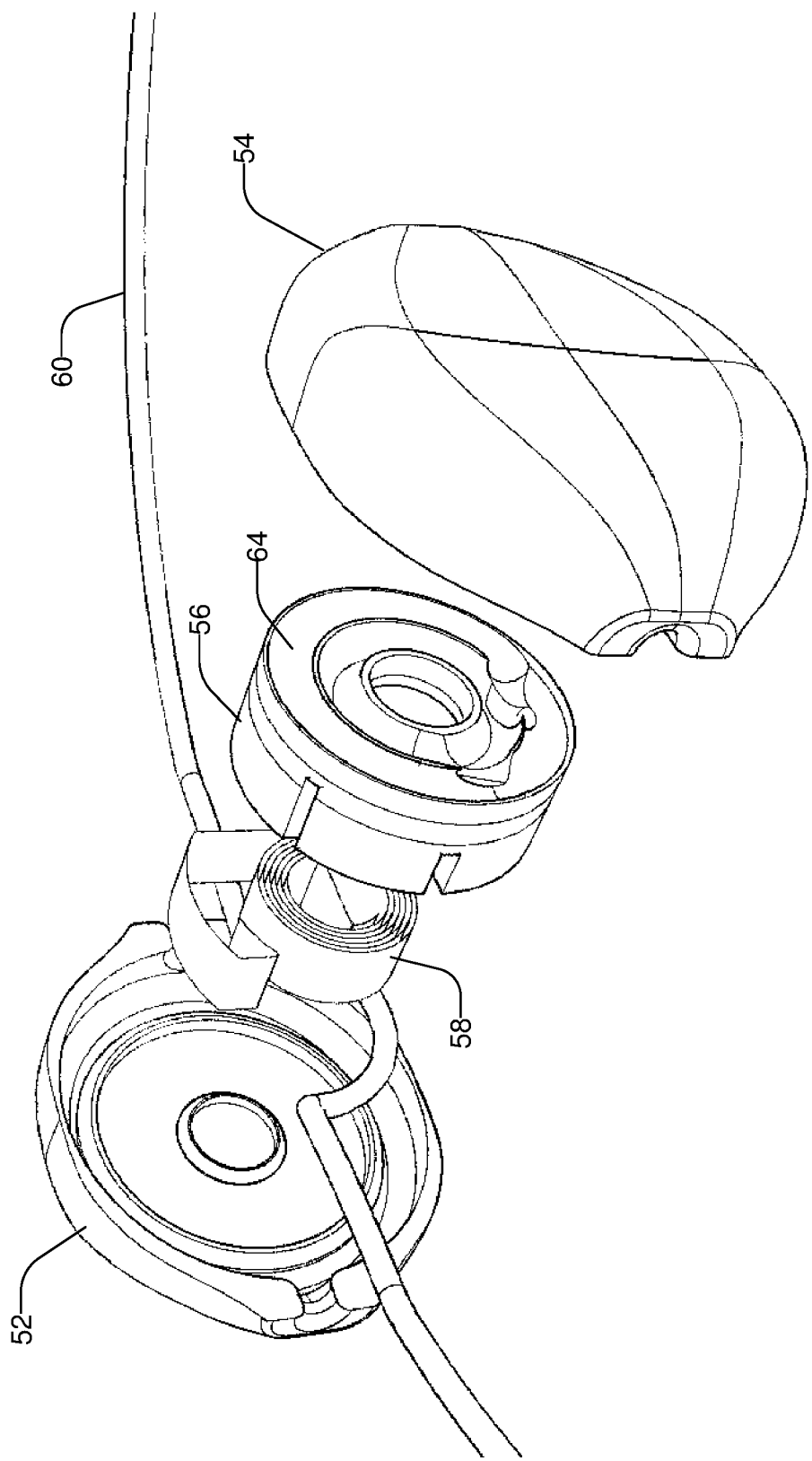
Figure 20:
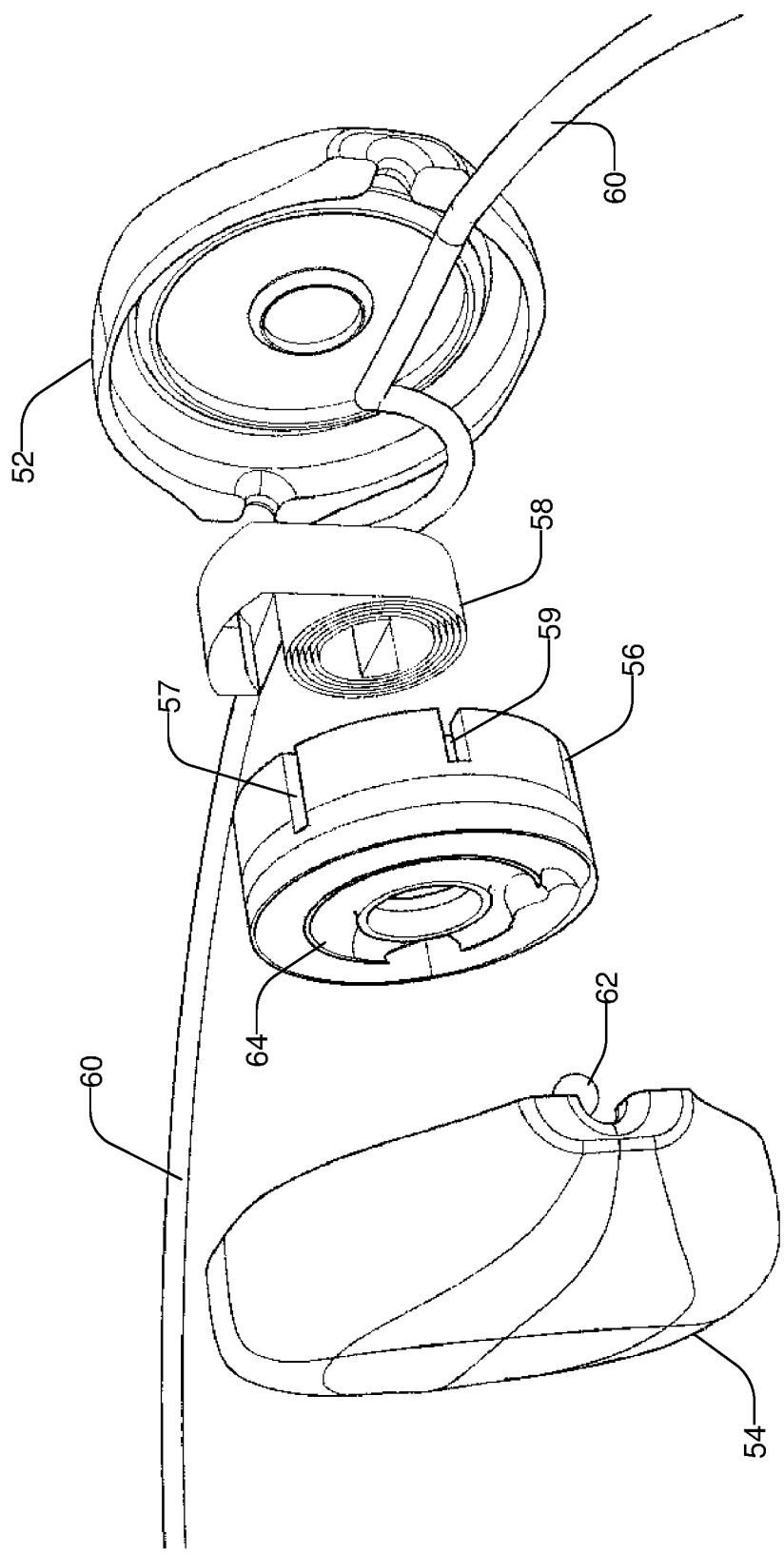
Figure 21:
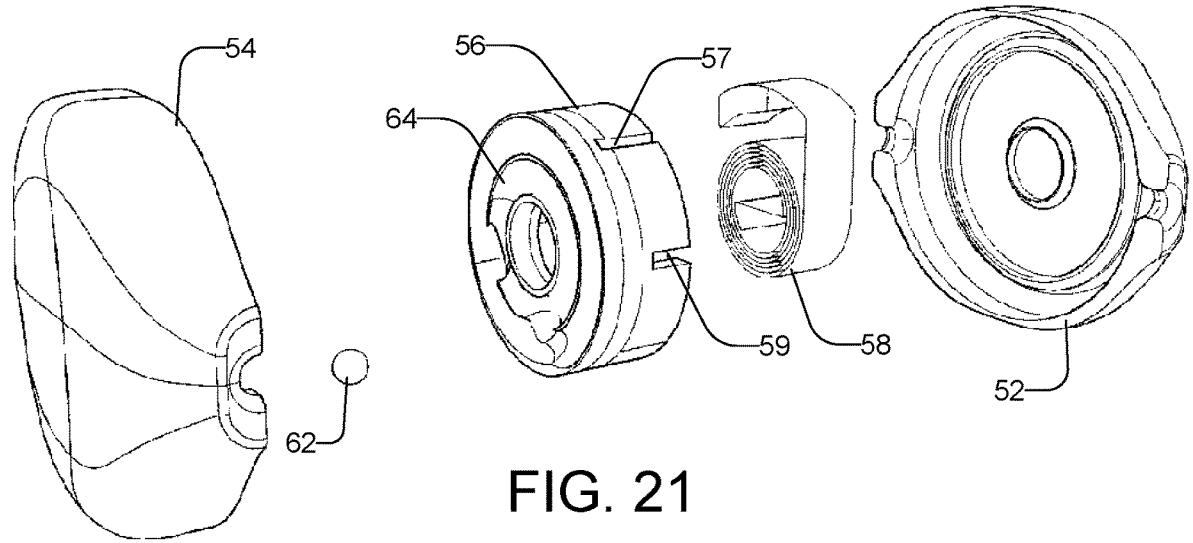
Figure 22:
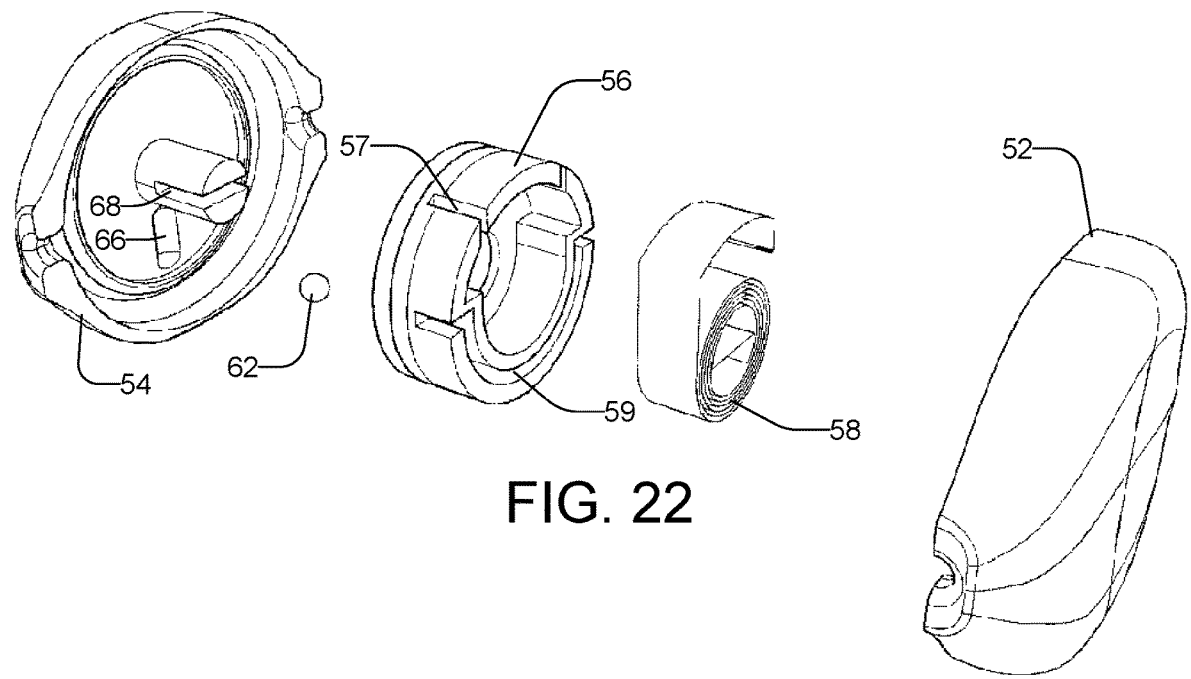
Figure 23:
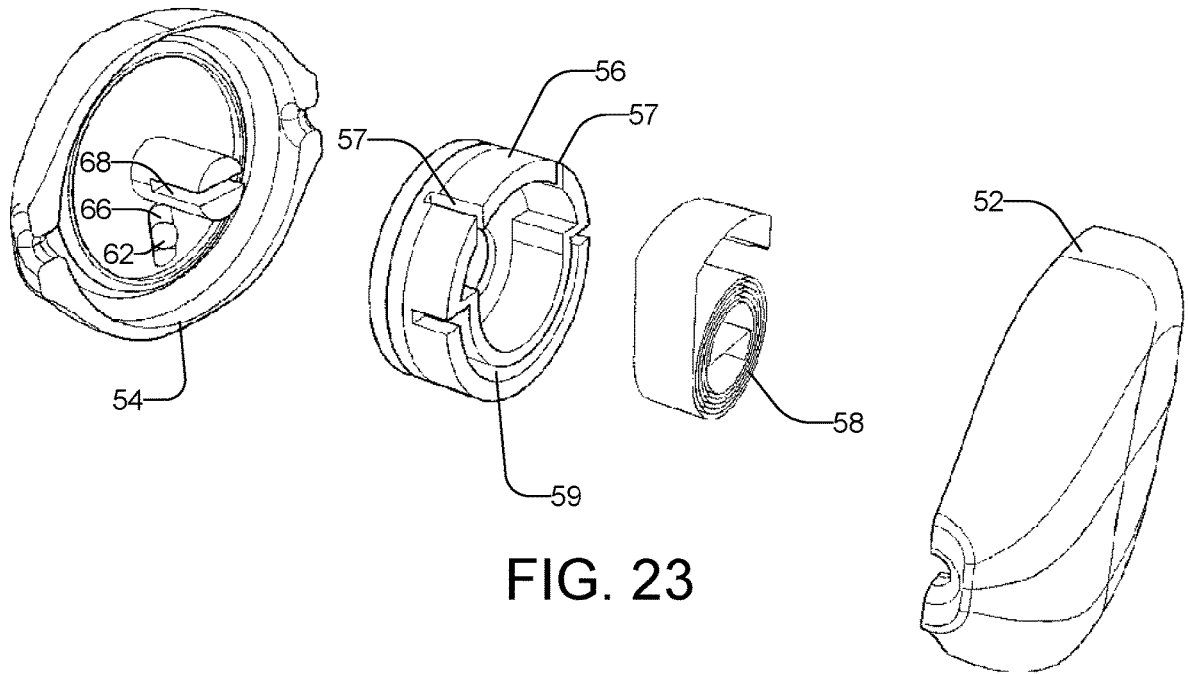
Figure 24:
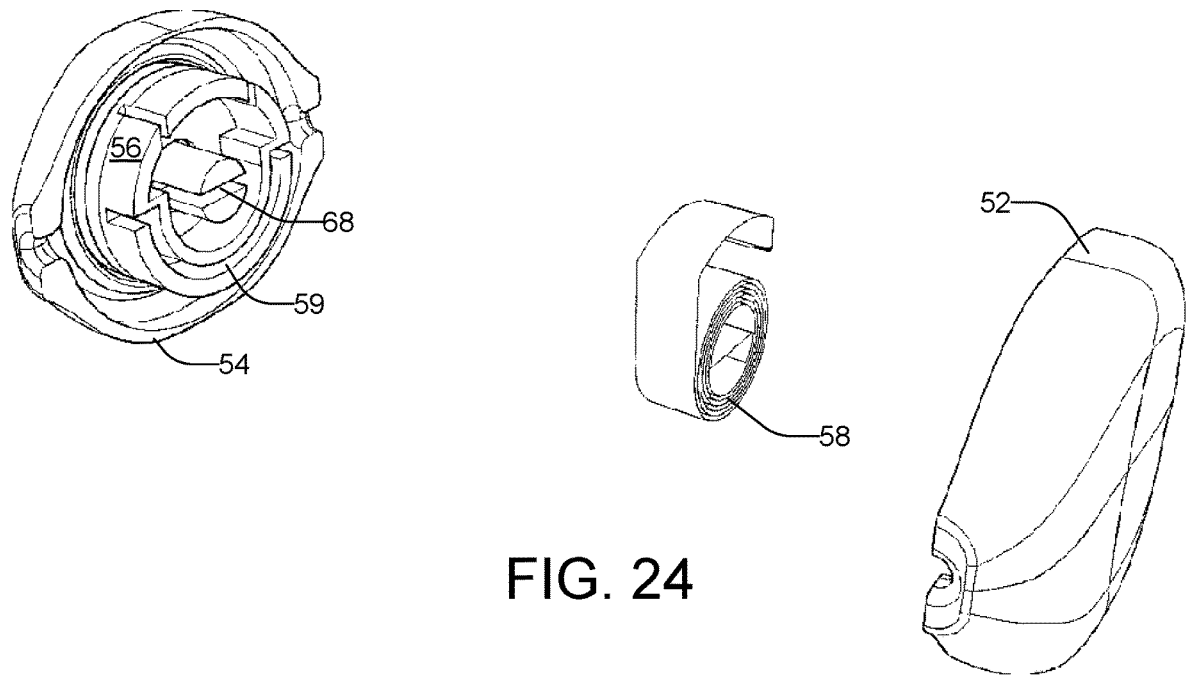
Figure 28:
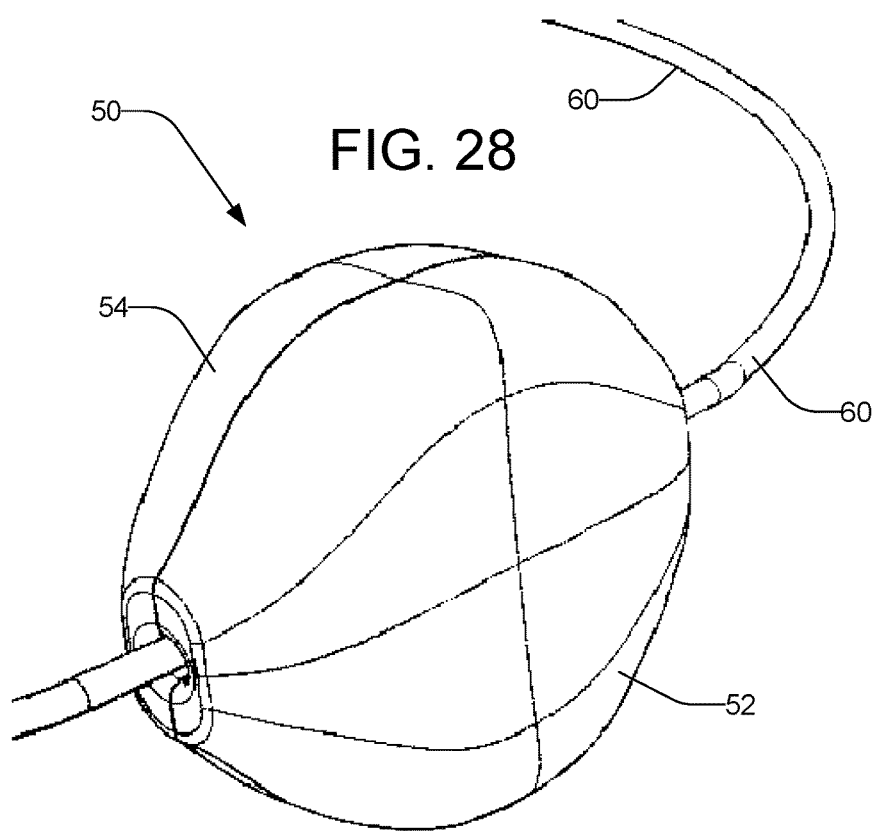
Figure 27:
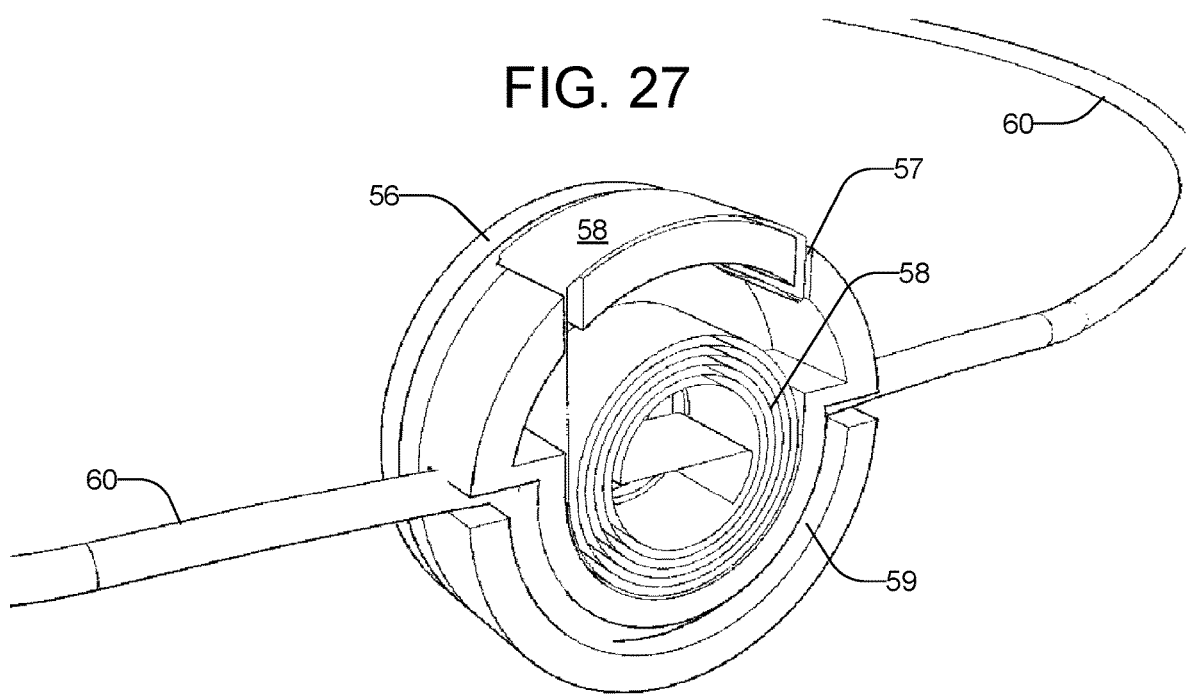
Figure 29:
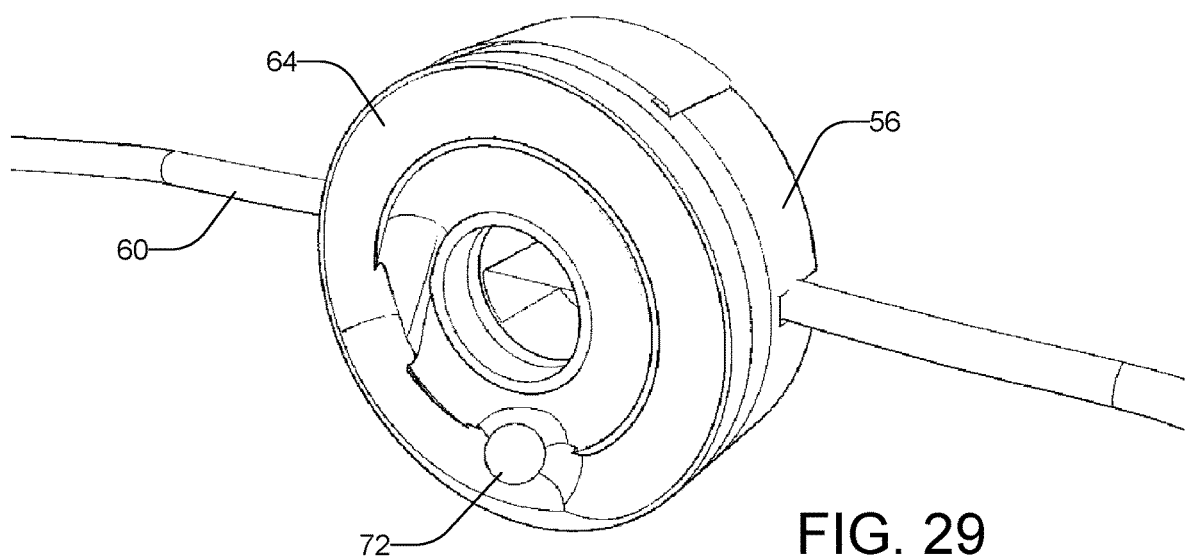
Figure 30:
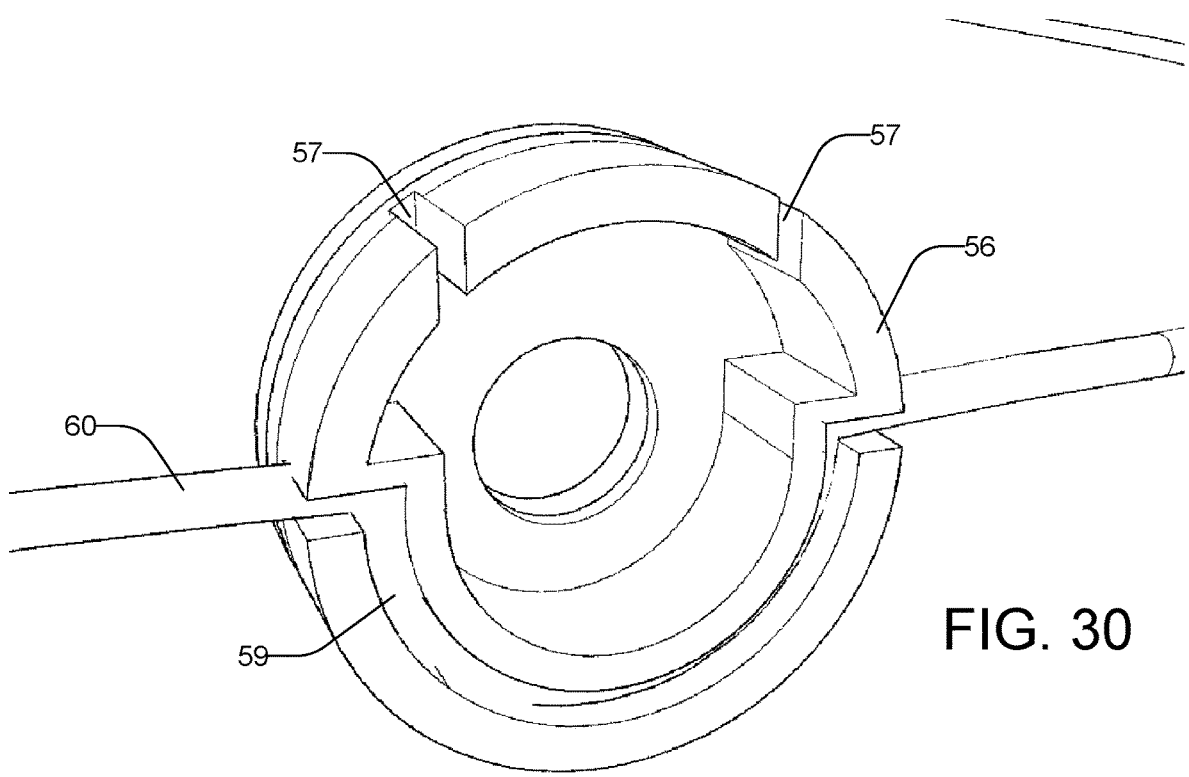
Figure 31:
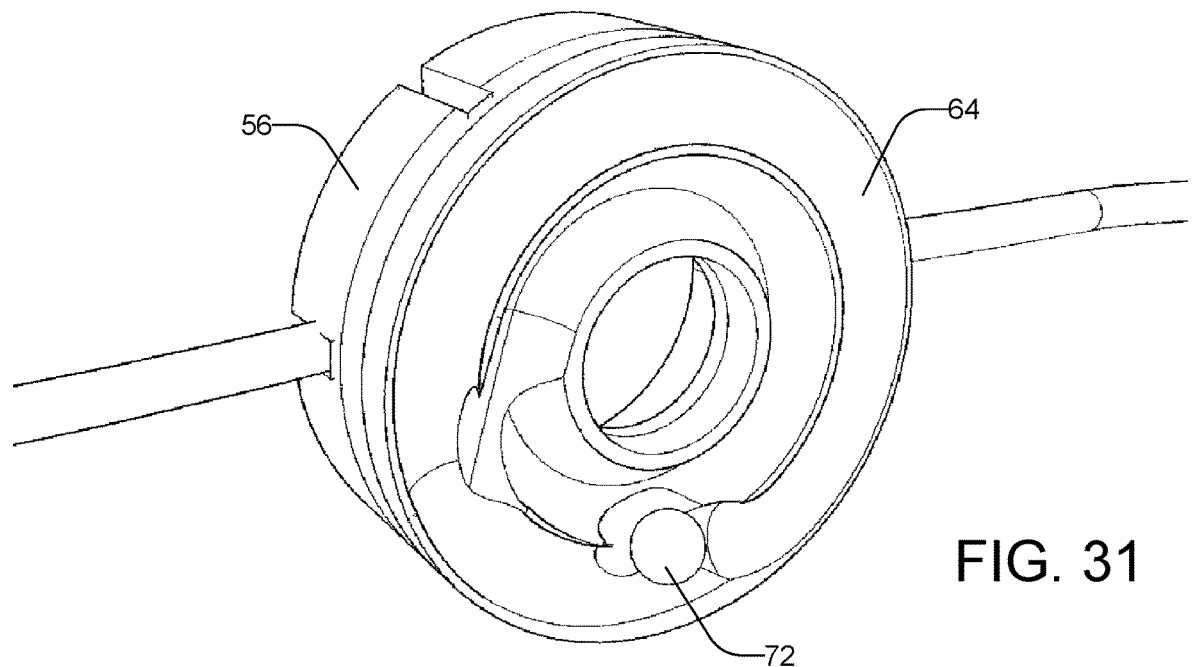
Figure 32:
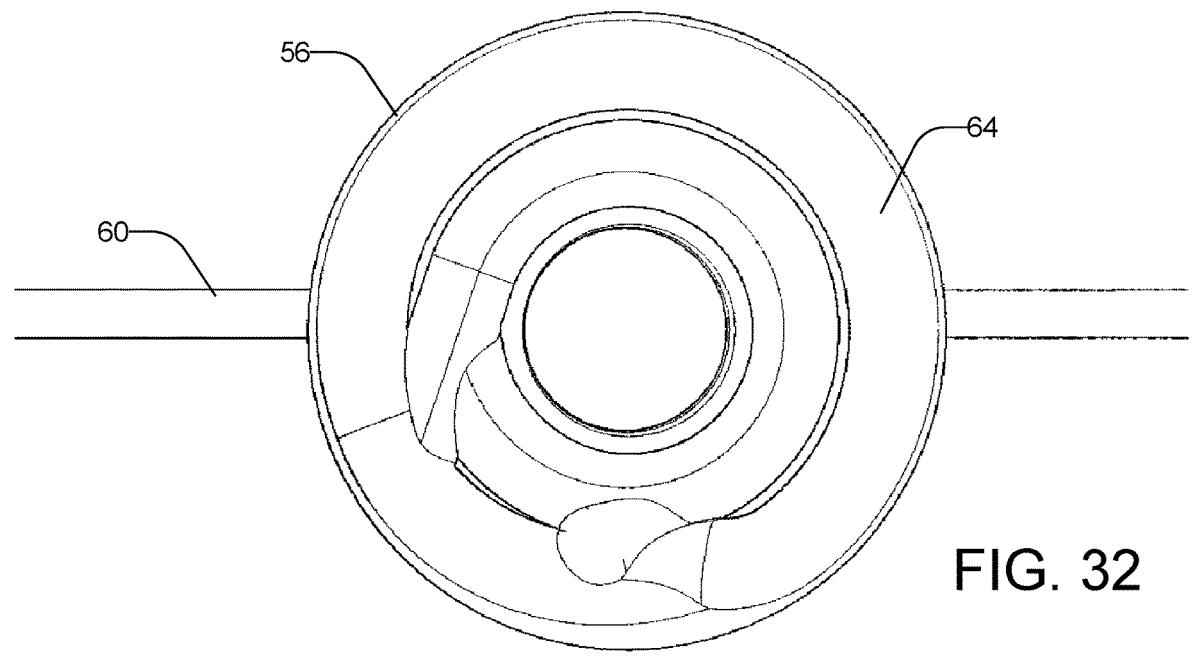
Figure 33:
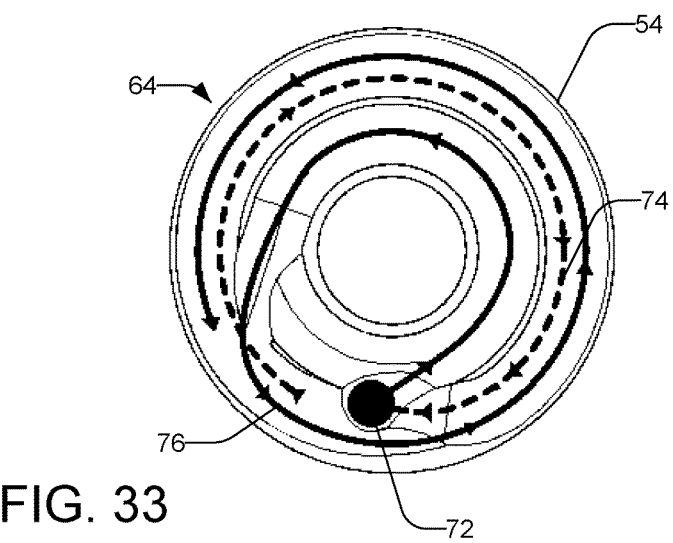
FIGS. 33 and 34 are drawings showing the operation of the ball bearing utilized to stop the spool from retracting.
Figure 34:
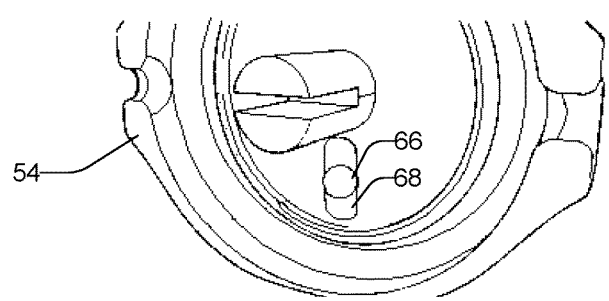

FIGS. 10-32 show an embodiment of the present invention utilizing a single retraction mechanism 50. FIG. 10 shows the major parts of this embodiment as a wire drawing. FIG. 11 shows this embodiment assembled in a perspective view. FIG. 12 shows this embodiment in a top view. FIGS. 14 and 15 show this embodiment with the front housing 52 removed. FIG. 16 shows this embodiment in a fully exploded side view. FIGS. 17-20 show this embodiment in a fully exploded perspective view. FIGS. 21-22 show this embodiment in fully exploded perspective views with the line or cable 60 removed. FIGS. 23-28 are perspective views showing the assembly of this embodiment of the present invention. FIGS. 29-32 are different views of the spool, in accordance with this embodiment of the present invention. FIGS. 33 and 34 are drawings showing the operation of the ball bearing utilized to stop the spool from retracting, in accordance with this embodiment of the present invention.

This embodiment has a single retractor 50 typically located in the center of the line or cable 60, with retention tubing 48 attached to each end of the line or cable 60, capable of removably attaching eyewear (not shown) to the retention system 46. The retractor 50 has a front housing 52 and a rear housing 54 that fit together when the retractor 50 is fully assembled. Within the retractor 50 are located a retractor spring 58, a retractor spool 56, and a retractor guide ball 62. The retractor spring 58 is utilized to retract the cable 60 when moving from an extended to a retracted position by winding it evenly from both sides around the retractor spool 56. The retractor spring 58 is inserted in the inside of top side of the retractor spool 56, with one end engaging slots 57 in the circumference of the retractor spool 56 and the other end in a spring retention slot 68 in the retractor rear housing 54. The cable 60 is inserted through a cable channel 59 in the retractor spool 56. When the cable 60 is extracted, the retractor spool 58 rotates, unwinding the cable 60, and putting tension on the retractor spring 58. The tension is then released when the retractor spool rotates in the opposite direction, moving from an extracted or extended position to a retracted position. The retractor guide ball 62 moves up and down in a rear housing guide ball channel 66 in the retractor rear housing 54, and rotates around the retractor spool 56 in a retractor spool guide ball channel 64. The retractor guide ball 62 operates to lock the cable 60 in an extracted or extended position. Then, when the cable 60 is pulled out on both sides of the retractor 50 (typically by pulling the eyewear out), the retractor guide ball 62 disengages, allowing the retractor spring 58 to retract the cable 60, winding it evenly around the retractor spool 56.

FIGS. 33 and 34 are drawings showing the operation of the retractor guide ball 62 utilized to stop the retractor spool 56 from retracting, when locked, in accordance with this embodiment of the present invention. There is a retractor spool guide ball channel 64 on the bottom side of the retractor spool 56 (facing the retractor rear housing 54). It comprises essentially two different tracks. When the cord 60 is pulled, and the cord extracted, the retractor spool 56 rotates counter clockwise (viewed from the back—the view shown in FIG. 33). The retractor guide ball 62 leaves a retractor spool guide ball stop point 72, and takes a first track 76 that starts on the inside, and then crosses to the outside of the retractor spool 56 right before encountering the retractor spool guide ball stop point 72. During this time, the retractor guide ball 62 follows this first track 76 allowing the retractor spool 56 to rotate freely. When the cord 60 is released, the retractor spring 58 rotates the retractor spool 56 clockwise in a second track 74 until the retractor guide ball 62 falls into the retractor spool guide ball stop point 72. This prevents the retractor spool 56 from rotating clockwise. It can only be released by rotating the retractor spool 56 counterclockwise (by pulling out the cords), which moves the retractor guide ball 62 into the first track 76, allowing the spring to cause the retractor spool 56 to be driven by the retractor spring 58, winding up the cord 60 until it is snug on the head of the user. FIG. 34 shows the retractor guide ball 62 in a retractor guide ball channel 66 located on the back side (inside) of the retractor rear housing 54. This limits the movement of the retractor guide ball 62 in a vertical plane. This is illustrative only, and other methods of stopping the cord, then releasing it to wind up around the spool are also within the scope of the present invention. Moreover, the locking mechanism may be manual instead of automatic as shown in these FIGs. For example, the lock may include a sliding lock located on the outside of either the front and/or rear housings.

While the invention in several forms, it will be obvious to those skilled in the art that is not so limited but is susceptible of various changes and modifications without departing from the spirit thereof. For example, the inventor envisions that the braided line may be replaced by a resilient plastic or carbon fiber replacement member exhibiting resiliency characteristics similar to a plastic, rubber or foam coated braided line An eyewear retention device is disclosed that includes a length of resilient braided or monofilament line, terminating at each end in a tapered, rubberized retention tubing, including retractable spring loaded mechanism or mechanism's molded in the ends of the retention tubing with a locking mechanism for easy extraction and retraction back and forth by simply pulling on said line. The combination of the resilient line and the mechanism or mechanism's produces a tensioned arc such that in addition to retaining eyewear around wearers head when in use when not in use with a simple pull on said line, the retention device forms a suspended arc over the wear's upper torso.

Those skilled in the art will recognize that modifications and variations can be made without departing from the spirit of the invention. Therefore, it is intended that this invention encompass all such variations and modifications as fall within the scope of the appended claims.

What is claimed is:

1. An eyewear retention device comprising:
   a length of line having a first end and a second end;
   a first spring loaded retractable spool attached to the first end of the length of line for retracting the line by rolling it around the first spring loaded retractable spool;
   a second spring loaded retractable spool attached to the second end of the length of line for retracting the line by rolling it around the second spring loaded retractable spool;
   a first retention tubing attached to the first spring loaded retractable spool for removably attaching eyewear to the eyewear retention device;
   a second retention tubing attached to the second spring loaded retractable spool for removably attaching eyewear to the eyewear retention device.

2. The eyewear retention device in claim 1 wherein the first retention tubing and second retention tubing are formed from a rubberized material wherein an inside surface of each retention tubing provides more friction than an outside surface of each retention tubing.

3. The eyewear retention device in claim 1 wherein the first spring loaded retractable spool and the second spring loaded retractable spool each contains a brake operable to place the respective spring loaded retractable spool in either a stopped state or a tension state.

4. The eyewear retention device of claim 1, wherein the length of line is a single contiguous length of line, the first end of which is attached to the first spring loaded retractable spool, and the second end of which is attached to the second spring loaded retractable spool.

5. The eyewear retention device of claim 4, wherein the length of line is comprised of a center region coated with a foam insulation, a first region retractable into the first spring loaded retractable spool, and a second region retractable into the second spring loaded retractable spool.

6. The eyewear retention device of claim 1, wherein the first retention tubing is directly attached to the first spring loaded retractable spool, and the second retention tubing is directly attached to the second spring loaded retractable spool.

7. An eyewear retention device comprising:
a length of line having a first end and a second end;
a first retention tubing attached to the first end of the line for removably attaching eyewear to the eyewear retention device;
a second retention tubing attached to the second end of the line for removably attaching eyewear to the eyewear retention device; and
a retraction mechanism located between the first end of the line and the second end of the line, the retraction mechanism comprising:
a housing;
a spring loaded retractable spool disposed within the housing and operable to retract the line by rolling the line around an exterior of the spool;
a guide ball disposable in a ball stop point in a side wall of the spool and operable to hold the spool in a locked state, and operable to transition to an unlocked state and move through a channel in the side wall of the spool, rendering the spool rotatable in extraction of the line from the spool and rotatable in retraction of the line by the spool.

8. The eyewear retention device in claim 7 wherein:
the spring loaded spool comprises a spring located within the spool, the spring engaging both the spool and the housing and operable to rotate the spool, thereby rolling the line around the spool when the spool is in the unlocked state.

9. An eyewear retention device comprising:
a) a cable comprised of a first end joinable to a first arm of an eyewear, a second end joinable to a second arm of an eyewear, a center region, a first retractable region between the center section and the first end, and a second retractable region between the center section and the second end;
b) a housing comprised of:
a front housing portion; and
a rear housing portion comprising a rear housing wall, a housing guide ball channel formed in the rear housing wall, and a center pin extending from the rear housing wall and having an open slot at a distal end of the center pin;

c) a retraction mechanism disposed within the housing and operable to retract the first and second retractable regions of the cable into the housing and release the first and second retractable regions of the cable from the housing, the retraction mechanism comprising:
a spool comprised of a body having a central opening defining a spool rotational axis and surrounding the central pin of the rear housing portion and rotatable around the central pin of the rear housing portion, a cable channel formed in the body and containing the center section of the cable, an exterior surface contiguous with first and second ends of the cable channel and operable to receive wound cable in operation of the device, and a side wall including a guide ball stop recess and a spool guide ball channel formed therein;
a wound spring disposed within a spring cavity in the body of the spool and surrounding the center pin of the rear housing portion, and comprising a first end disposed in the open slot of the center pin, and a second end disposed in a slot formed in the body of the spool; and
a guide ball contained within the housing guide ball channel, the spool guide ball channel, and the guide ball stop recess.

10. The eyewear retention device of claim 9, wherein when the guide ball is disposed in the guide ball stop recess, the guide ball stop recess acts as a guide ball stop point, rendering the spool in a locked state and immobilizing the cable relative to the housing when no external tension is applied to the cable.

11. The eyewear retention device of claim 10, wherein when external tension is applied to the cable, the spool is operable to rotate, releasing the guide ball from the guide ball stop recess and rendering the spool in an unlocked state.

12. The eyewear retention device of claim 11, wherein the application of sustained external tension on the cable causes the spool to rotate in an extraction direction, thereby releasing portions of the first and second retractable regions of the cable from the housing, and causing the guide ball to cycle through the spool guide ball channel.

13. The eyewear retention device of claim 11, wherein the application of a temporary external tension on the cable causes the guide ball to be released from the guide ball stop recess, and subsequent release of the external tension enables the spool to rotate in a retraction direction, thereby retracting portions of the first and second retractable regions of the cable into the housing, and causing the guide ball to cycle through the spool guide ball channel.

* * * * *